(12) United States Patent
Yoshizawa et al.

(10) Patent No.: US 10,400,599 B2
(45) Date of Patent: Sep. 3, 2019

(54) EXPANDER AND AIR REFRIGERATION DEVICE WITH THE SAME

(71) Applicants: Z Mechanism Technology Institute Co., Ltd., Yonezawa-shi (JP); TAC Research Inc., Yonezawa-shi (JP)

(72) Inventors: Yasuo Yoshizawa, Yonezawa (JP); Takumi Yoshizawa, Yonezawa (JP); Yutaka Yoshizawa, Yonezawa (JP); Satoshi Yoshizawa, Yonezawa (JP); Jun Nango, Yonezawa (JP)

(73) Assignees: Z MECHANISM TECHNOLOGY INSTITUTE CO., LTD., Yonezawa-Shi, Yamagata-Ken (JP); TAC RESEARCH INC., Yonezawa-Shi, Yamagata-Ken (JP)

( * ) Notice: Subject to any disclaimer, the term of this patent is extended or adjusted under 35 U.S.C. 154(b) by 90 days.

(21) Appl. No.: 15/284,160

(22) Filed: Oct. 3, 2016

(65) Prior Publication Data

US 2017/0022810 A1  Jan. 26, 2017

Related U.S. Application Data

(63) Continuation-in-part of application No. PCT/JP2014/060041, filed on Apr. 4, 2014.

(51) Int. Cl.
*F25B 9/00* (2006.01)
*F01B 1/01* (2006.01)
(Continued)

(52) U.S. Cl.
CPC .............. *F01B 1/01* (2013.01); *F01B 9/023* (2013.01); *F25B 9/004* (2013.01); *F25B 9/06* (2013.01);
(Continued)

(58) Field of Classification Search
CPC .... F01B 1/01; F01B 9/023; F25B 9/06; F25B 11/02
See application file for complete search history.

(56) References Cited

U.S. PATENT DOCUMENTS

| 8,080 A | 5/1851 | Gorrie |
| 2,405,016 A | 7/1946 | Cook |

(Continued)

FOREIGN PATENT DOCUMENTS

| CN | 100577990 C | 1/2010 |
| CN | 103492757 A | 1/2014 |

(Continued)

OTHER PUBLICATIONS

Search Report dated Jan. 22, 2018 by the Intellectual Property Office of Singapore in connection with related Singaporean Patent Application No. SG 11201608324Y.

(Continued)

*Primary Examiner* — David J Teitelbaum
(74) *Attorney, Agent, or Firm* — John P. White; Cooper & Dunham LLP

(57) ABSTRACT

According to one embodiment, an expander includes a piston provided reciprocatively in a first direction in a cylinder, a crankshaft, an XY-separation crank mechanism provided between the piston and the crankshaft, which converts a reciprocating motion of the piston and a rotary motion of the crankshaft into one another, a cylinder head including an intake port and an outlet port, a suction valve which opens/closes the intake port, a discharge valve which opens/closes the outlet port, an intake-side valve mechanism which opens/closes the suction valve and an outlet-side valve mechanism which opens/closes the discharge valve. At least one of the intake-side and outlet-side valve mechanisms includes an XY separation drive mechanism.

13 Claims, 19 Drawing Sheets

(51) Int. Cl.
   *F01B 9/02* (2006.01)
   *F25B 9/06* (2006.01)
   *F25B 11/02* (2006.01)
(52) U.S. Cl.
   CPC ......... *F25B 11/02* (2013.01); *F25B 2400/141* (2013.01)

(56) References Cited

U.S. PATENT DOCUMENTS

| | | | | |
|---|---|---|---|---|
| 3,572,299 | A * | 3/1971 | Lester | F01L 1/30 123/90.25 |
| 3,694,109 | A | 9/1972 | Walls | |
| 4,226,169 | A | 10/1980 | Mazur et al. | |
| 4,520,632 | A * | 6/1985 | Dibrell | F01B 5/006 165/86 |
| 4,580,413 | A | 4/1986 | Klee | |
| 5,092,131 | A * | 3/1992 | Hattori | F25B 9/06 60/520 |
| 5,535,709 | A * | 7/1996 | Yoshizawa | F01B 9/02 123/197.3 |
| 2009/0013681 | A1 | 1/2009 | Courtright | |
| 2011/0083434 | A1 * | 4/2011 | Peoples | F01B 7/20 60/618 |
| 2012/0090571 | A1 | 4/2012 | Namikoshi | |
| 2014/0041622 | A1 | 2/2014 | Yoshizawa et al. | |

FOREIGN PATENT DOCUMENTS

| | | |
|---|---|---|
| EP | 1 891 304 | 6/2006 |
| JP | 59-231255 A | 12/1984 |
| JP | S62-217060 A | 9/1987 |
| JP | H01-139958 | 6/1989 |
| JP | H10-160317 | 6/1998 |
| JP | 2002-318027 | 10/2002 |
| JP | 2003-214103 A | 7/2003 |
| JP | 2004-093133 | 3/2004 |
| JP | 2009-317081 | 11/2004 |
| JP | 5393907 B1 | 1/2014 |
| WO | WO 98/49434 A1 | 11/1998 |
| WO | WO 2006/060859 A1 | 6/2006 |
| WO | WO 2010/150307 | 12/2010 |

OTHER PUBLICATIONS

James Alfred Ewing, "The mechanical production of cold", (1908), pp. 41-45, The Cambridge University Press.
John Gladstone, "The First Century of Air Conditioning, Article 1: John Gorrie, The Visionary", ASHRAE Journal, Dec. 1998, pp. 29-35, vol. 40, No. 12, ASHRAE.
International Preliminary Report on Patentability and Written Opinion of the International Searching Authority in connection with PCT/JP2014/060041.
Extended European Search Report dated May 9, 2017 in connection with related European Patent Application No. EP 14888109.7.
International Search Report in connection with PCT international Application No. PCT/JP2014/060041.
Aug. 24, 2018 Chinese official action (and English translation thereof) in connection with Chinese patent application No. 201480077795.4

* cited by examiner

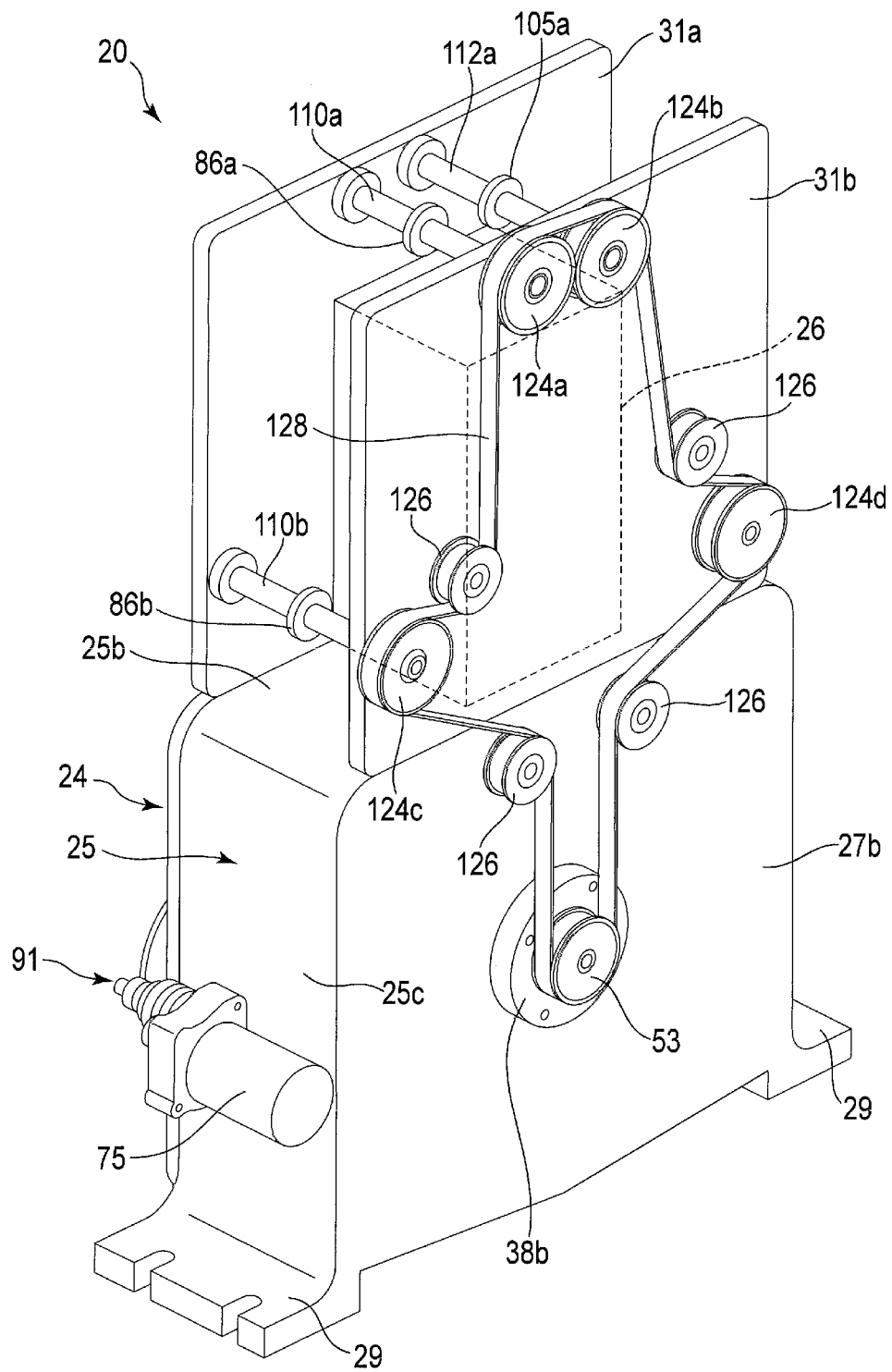
F I G. 3

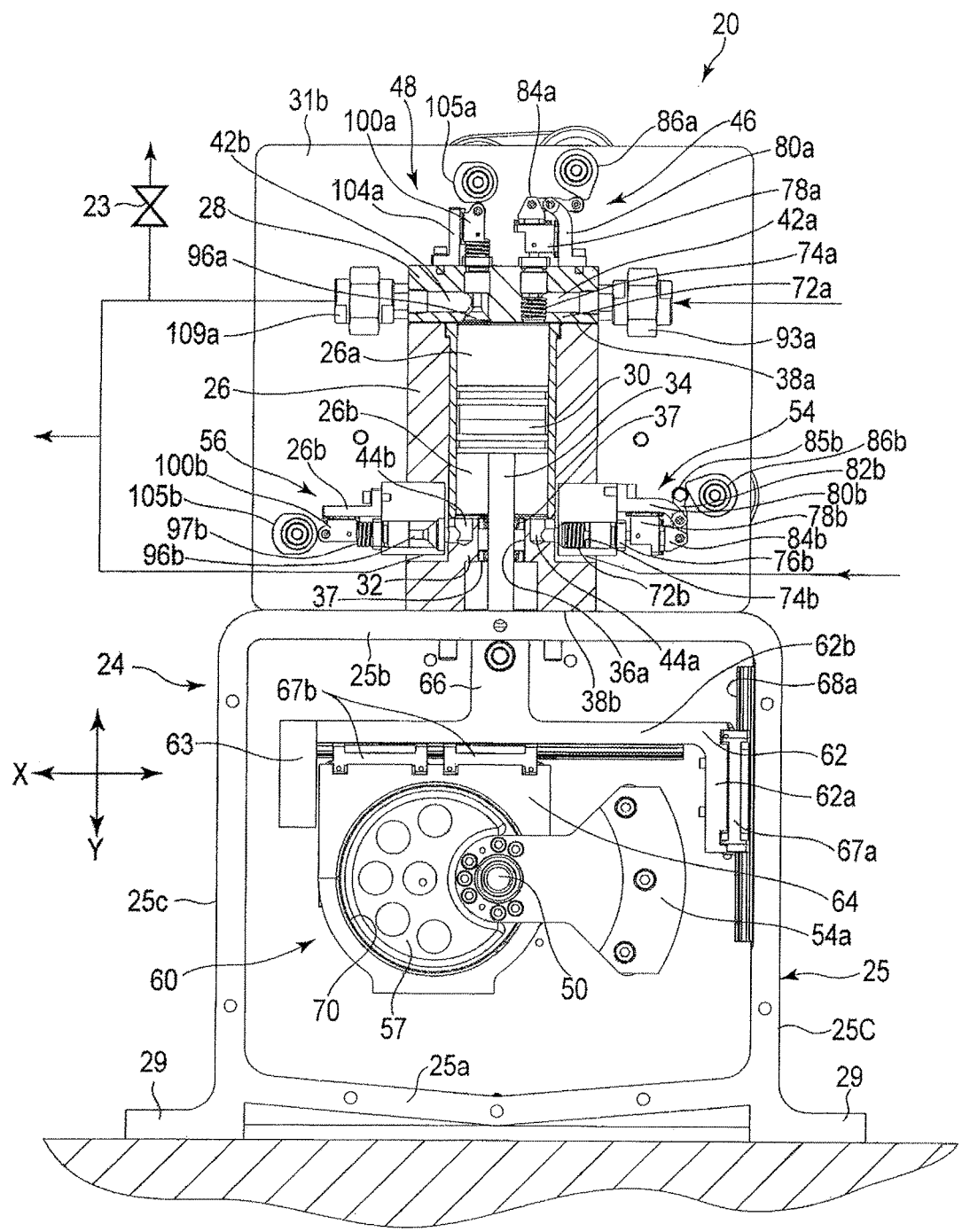
F I G. 5

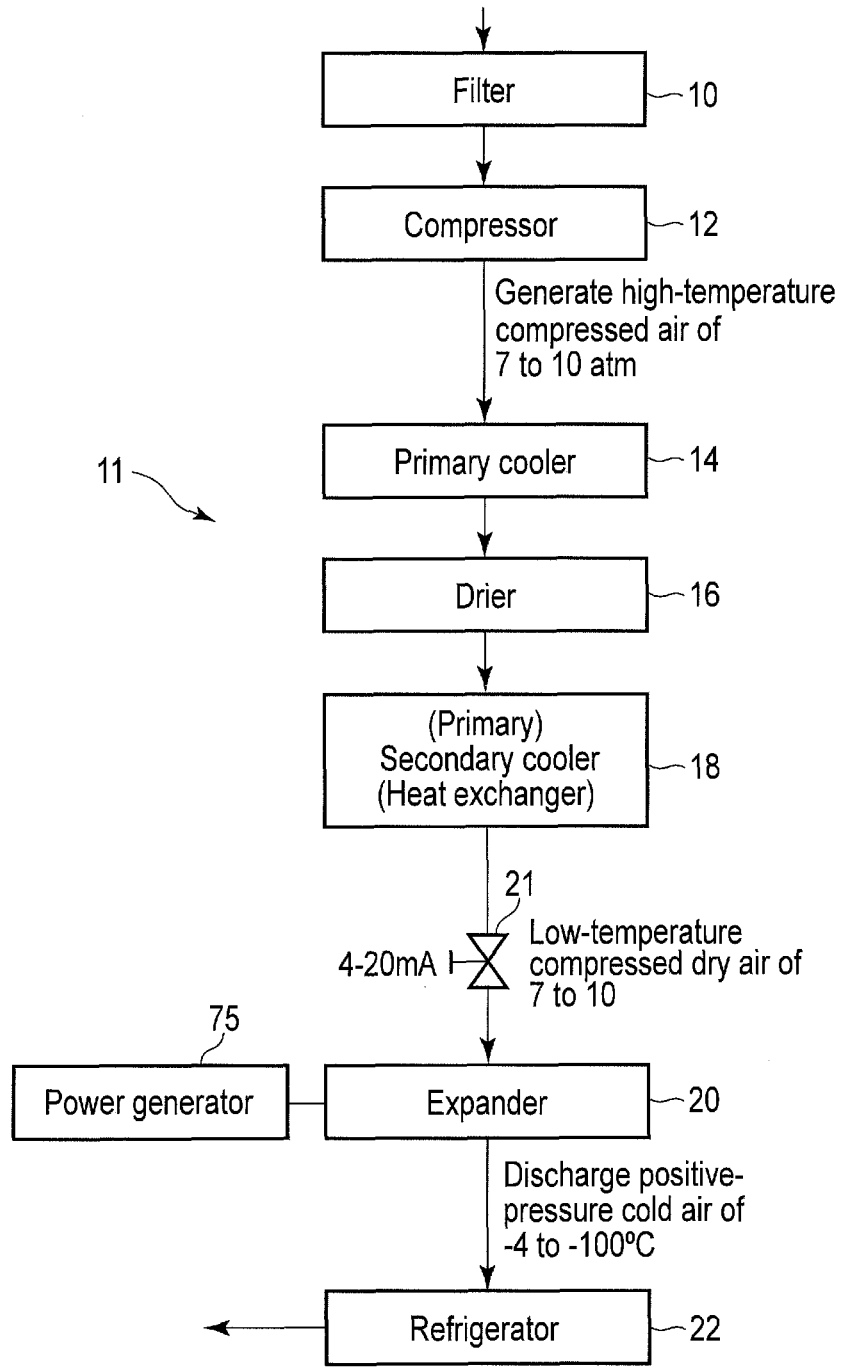
F I G. 11

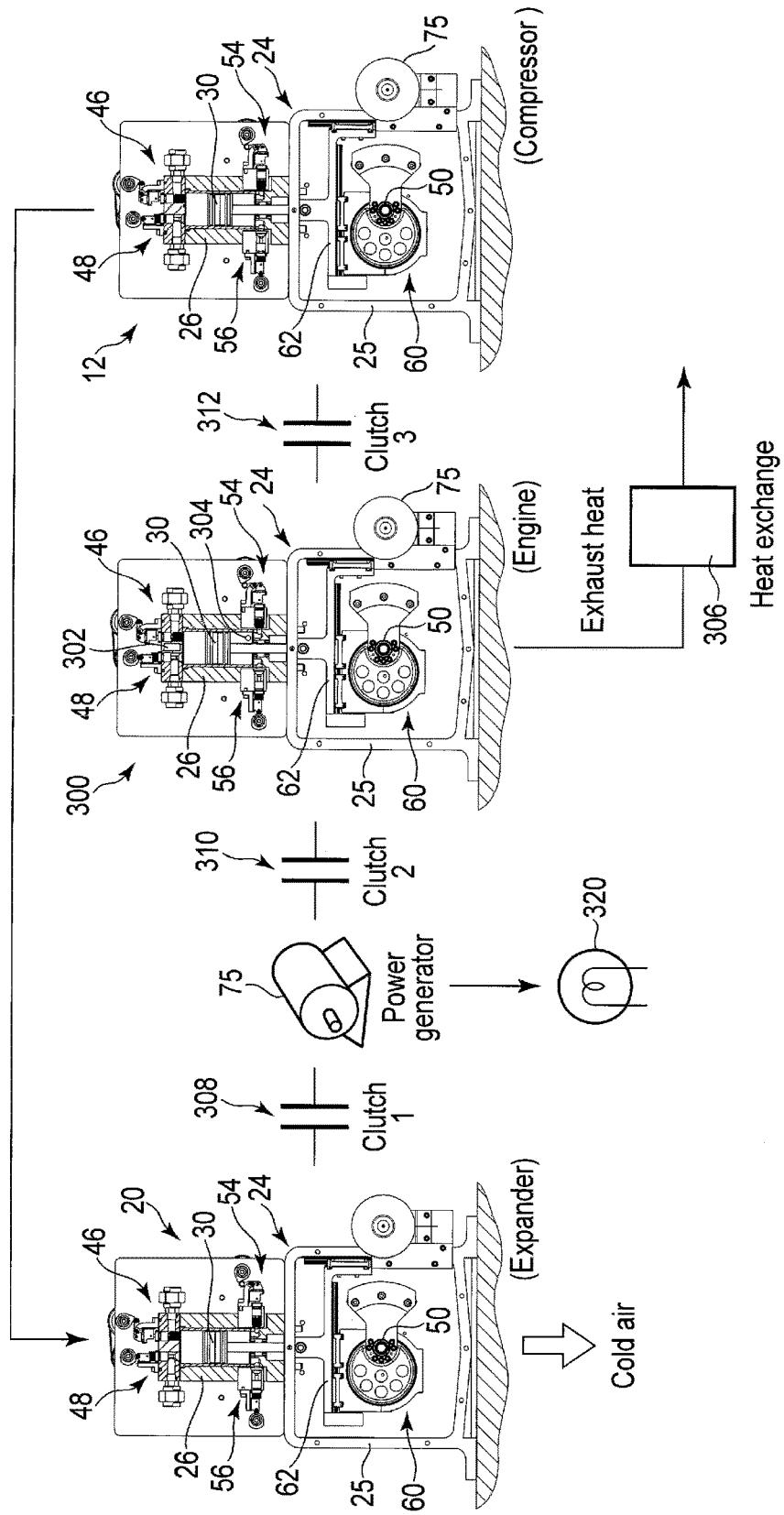
F I G. 15

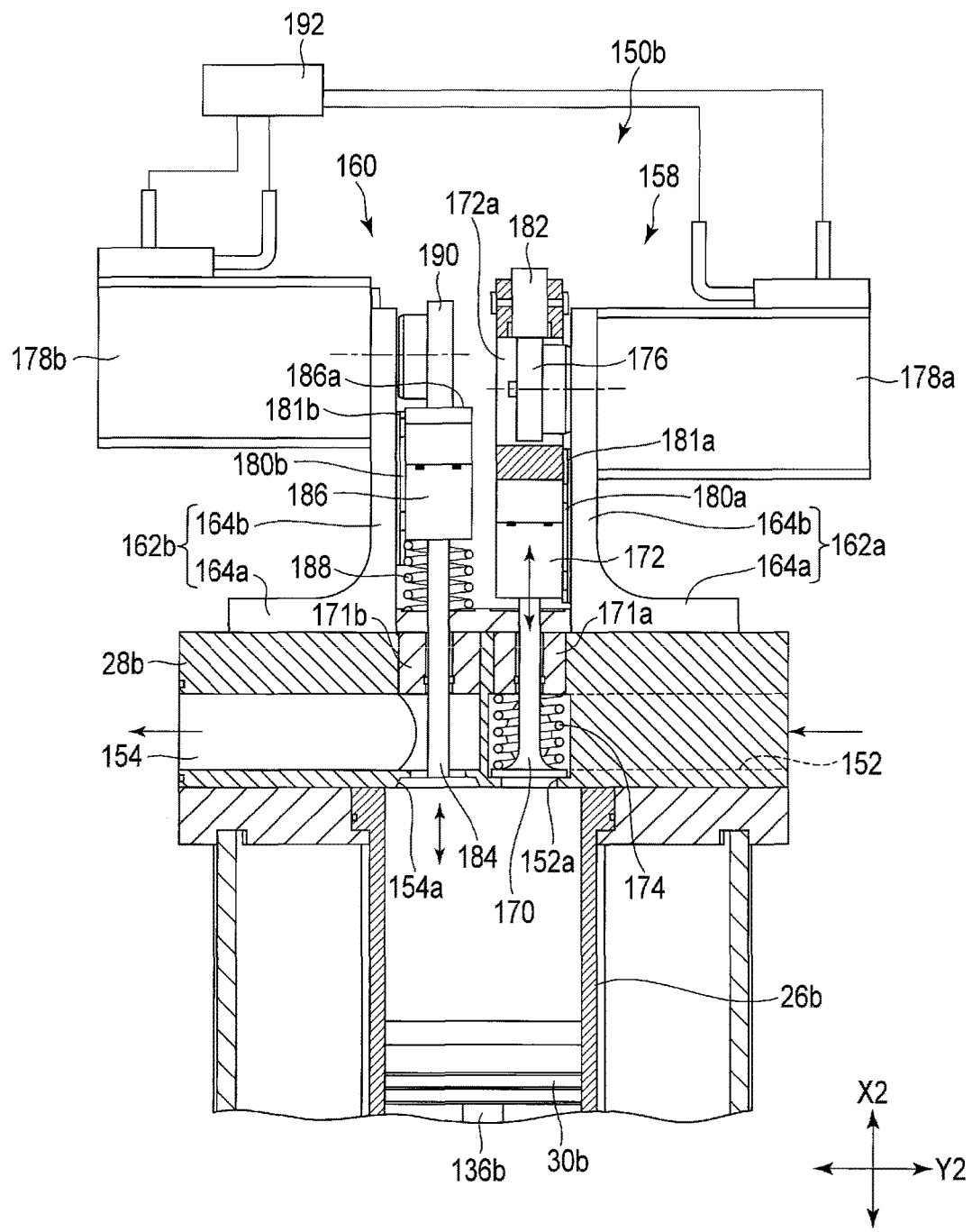
F I G. 22

EXPANDER AND AIR REFRIGERATION DEVICE WITH THE SAME

FIELD

Embodiments of the present invention relate to an expander comprising an XY separate crank mechanism that converts reciprocating motion into rotary motion or rotary motion into reciprocating motion and transmits the converted motion and an air refrigerating device comprising the expander.

BACKGROUND

The air freezing technology was invented by Gorrie et al. 140 years ago, and the world's first ice making started then.

After that, the refrigeration efficiency has been improved by using coolants such as ammonia and chlorofluocarbon. However, due to the problem of global warming, the use of chlorofluocarbon, which has a high environmental problem index, has been inhibited.

Under these circumstances, the air freezing technology, which uses natural air for freezing, has been attracting attention again. Many of the expanders provided for such air freezing device employ a turbine. There have been other types of the expanders proposed, which form a cylinder piston member for cooling air from a piston, a crosshead, a connecting rod and a crank, which can reduce generation of heat by side thrust loss. Further, air refrigeration by means of the rotation-reciprocation conversion using a planetary gear has been developed.

The air refrigeration device employing the turbine-type expander has a compression-expansion ratio small as 2 to 3 and therefore need to be equipped with a plurality of turbines of two stages or three stages. With such a structure, the entire device is large, and is difficult to be made smaller. Further, such an expander entails drawbacks that it need to make the rotation constant at high speed and is difficult to adjust the temperature. Also, the turbine is easily damaged and expensive. Unless the rotation speed of the turbine is increased, the efficiency is low. At the same time, because of the high-speed rotation, the turbine is easily damaged. If one blade of a turbine is broken, other blades are always entangled and broken, easily making the damage worse.

Such an expander which employs a piston, a crosshead, a connecting rod and a crank becomes large, and is difficult to be made smaller or be multicylinder. Further, such an expander is operated at a low speed of about 300 rpm, and it is difficult to increase its speed. Further, the efficiency is low.

An expander which employs planetary gears has a large gear loss, and operates in one stage, which increases the size of the cylinder. Therefore, it is difficult to increase the volume. Further, the expander is difficult to be made into a multicylinder type or increase its speed. Instead of making a multicylinder reduction, usually, expanders of the same type are simultaneously operated, which increases the size and degrades the efficiency.

BRIEF DESCRIPTION OF THE DRAWINGS

FIG. 3 is a perspective view showing a back side of the expander.

FIG. 5 is a front view of the expander.

FIG. 11 is a block diagram schematically showing an air refrigeration device according to the second embodiment.

FIG. 15 is a side view schematically showing an air refrigeration device according to the third embodiment.

FIG. 22 is am exploded side view showing a part of the valve mechanism.

DETAILED DESCRIPTION

Various embodiments will be described hereinafter with reference to the accompanying drawings. In general, according to one embodiment, an expander comprises:

a piston provided reciprocatively in a first direction in a cylinder;

a crankshaft extending to intersects perpendicularly a reference plane including a moving axis in the first direction of the piston;

an XY-separation crank mechanism provided between the piston and the crankshaft, which converts a reciprocating motion of the piston and a rotary motion of the crankshaft into one another, the XY-separation crank mechanism comprising a support member reciprocative in the first direction, and a crank connection member provided reciprocatively on the support member in a second direction perpendicular to the first direction, to which a crank of the crankshaft is rotatably engaged, and a coupling member which couples the piston and the support member so as to reciprocate together with the piston and the support member in the first direction, a cylinder head provided on the cylinder to define a first expansion/compression chamber between the cylinder head and the piston, and including an intake port and an outlet port which communicate to the first expansion/compression chamber;

a suction valve supported reciprocatively by the cylinder head in a third direction, which opens/closes the intake port a discharge valve supported reciprocatively by the cylinder head in a fourth direction, which opens/closes the outlet port;

an intake-side valve mechanism which opens/closes the suction valve; and an outlet-side valve mechanism which opens/closes the discharge valve. At least one of the intake-side valve mechanism and the outlet-side valve mechanism comprises an XY separation drive mechanism.

Hereafter, an example of an expander including a Z-mechanism XY-separation crank according to an embodiment and an air refrigeration device including the same will now be described with reference to drawings.

First Embodiment

First, the overall structure of an air refrigeration device will be described.

Figure 1:
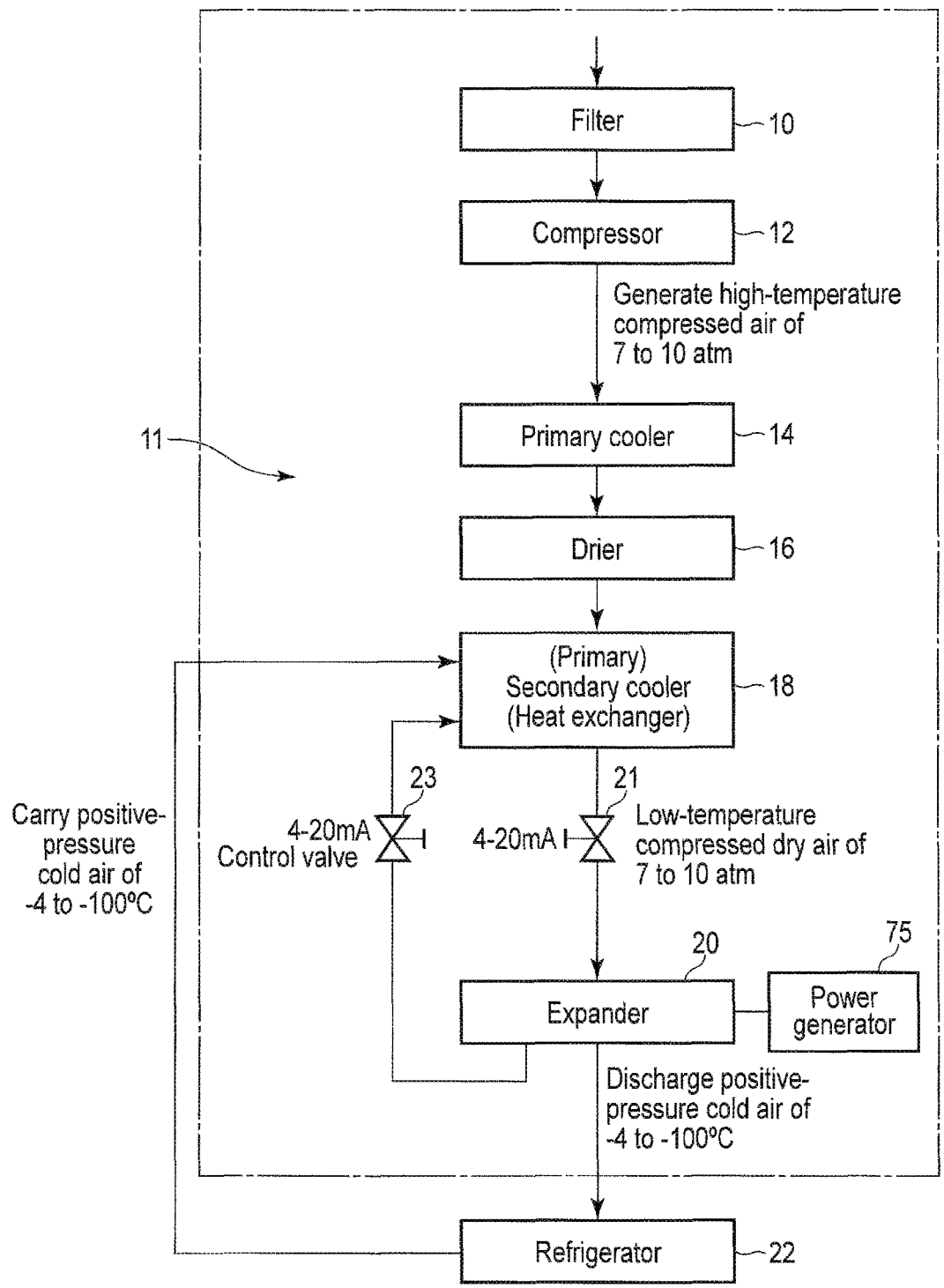
FIG. 1 is a block diagram schematically showing an air refrigeration device including an expander according to the first embodiment.

FIG. 1 is a block diagram schematically showing an air refrigeration device including an expander according to the first embodiment. As shown in this figure, an air refrigeration device 11 comprises a compressor 12 with an entry-side filter 10 provided in an air-intake side, a primary cooler (heat exchanger) 14 connected to an exhaust side of the compressor 12, a drier 16, a secondary cooler (heat exchanger) 18 connected to an exhaust side of the drier 16, an expander 20 which cools the cold air sent from the secondary cooler by adiabatic expansion, and a power generator 75 drivable with regenerative energy of the expander 20. Between the secondary cooler 18 and the expander 20, a control valve 21 is provided to adjust the flow of air. The exhaust side of the expander 20 is communicated to a refrigerator (freezer) 22 in which, for example, items to be cooled, such as perishable foods and frozen food, are accommodated. Further, a part of the exhaust side of the expander 20 is connected to the secondary cooler 18 through a control valve 23, and an exhaust side of the freezer 22 is further connected to the secondary cooler 18. The filter 10, the compressor 12, the primary cooler 14, the drier 16, the secondary cooler 18 and the expander 20 may be placed either indoor or outdoor.

In the air refrigeration device 11, indoor or outdoor natural air is taken through the filter 10 into the compressor 12, where it is adiabatically compressed into high-temperature, high-pressure air of about 7 to 10 atmospheres, and then discharged from the compressor 12. After the compression the high-temperature, high-pressure air is sterilized by its own heat. Subsequently, the high-temperature, high-pressure air is sent to the primary cooler 14, where it is cooled by room temperature air to room temperature, and then subjected to removal of water content by the drier (chemical drier, a membrane dryer or the like) 16 in moisture. Furthermore, the air is cooled to a negative temperature zone by the secondary cooler 18, into low-temperature, high-pressure dry air of about 7 to 10 atmospheres. Here, the returning cold air from the freezer 22 and controlled cold air from the expander 20 can be used by the secondary cooler 18 to improve the air cooling efficiency.

The low-temperature, high-pressure air sent from the secondary cooler 18 is taken into the expander 20, where it is adiabatically expanded into a cold air of even lower temperature, for example, of −100° C. The cold air (positive-pressure cold air) is discharged from the expander 20 to be supplied to the freezer 22. With this operation, the inside of the freezer 22 is cooled to −80° C. at a positive pressure. Excessive cold air in the freezer 22 is returned to the secondary cooler 18 and after passing the secondary cooler 18, it is released to the atmosphere by the positive pressure.

Next, the expander 20 according to this embodiment will be described in detail.

Figure 2:
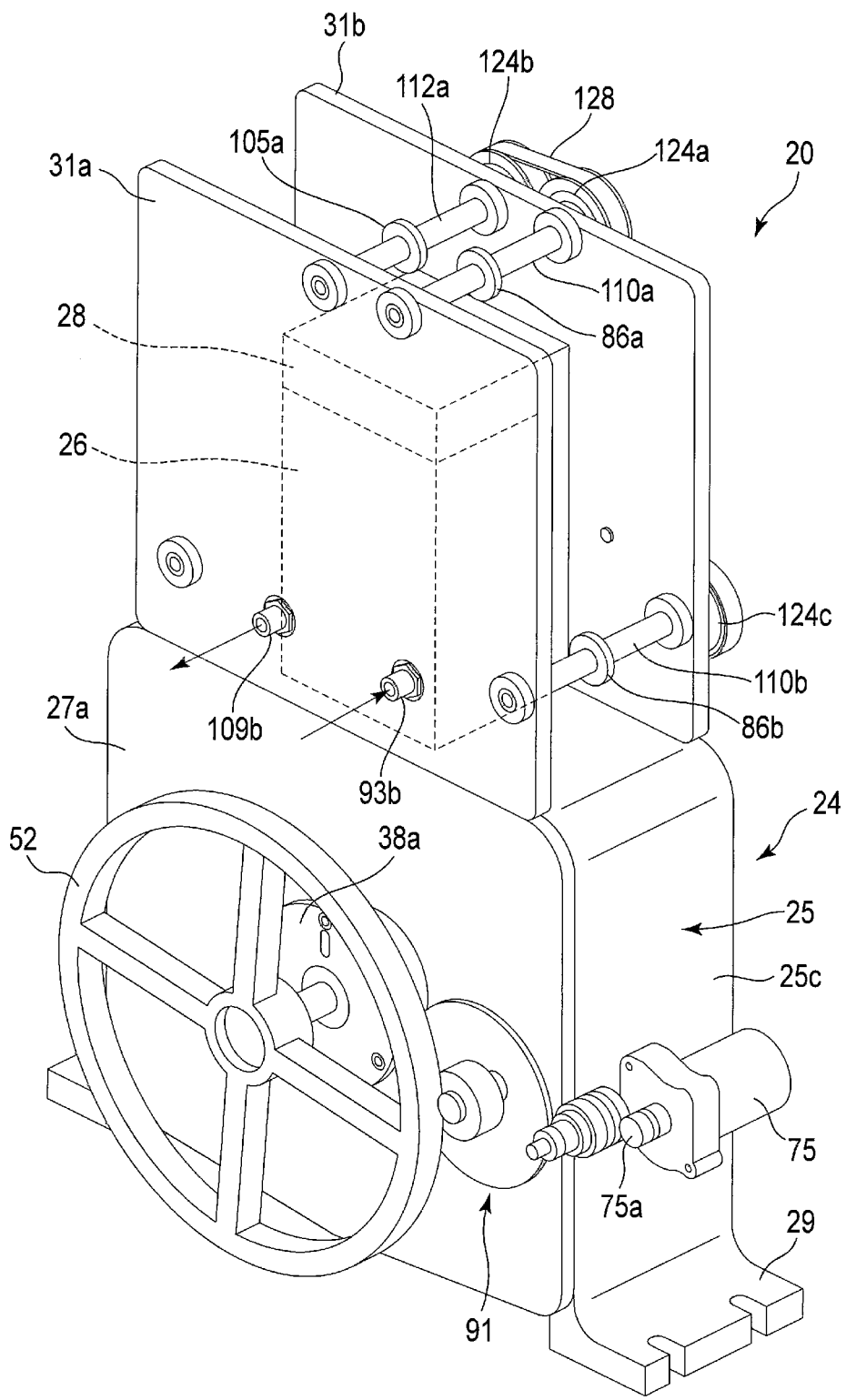
FIG. 2 is a perspective view showing an appearance of the expander.
Figure 4:
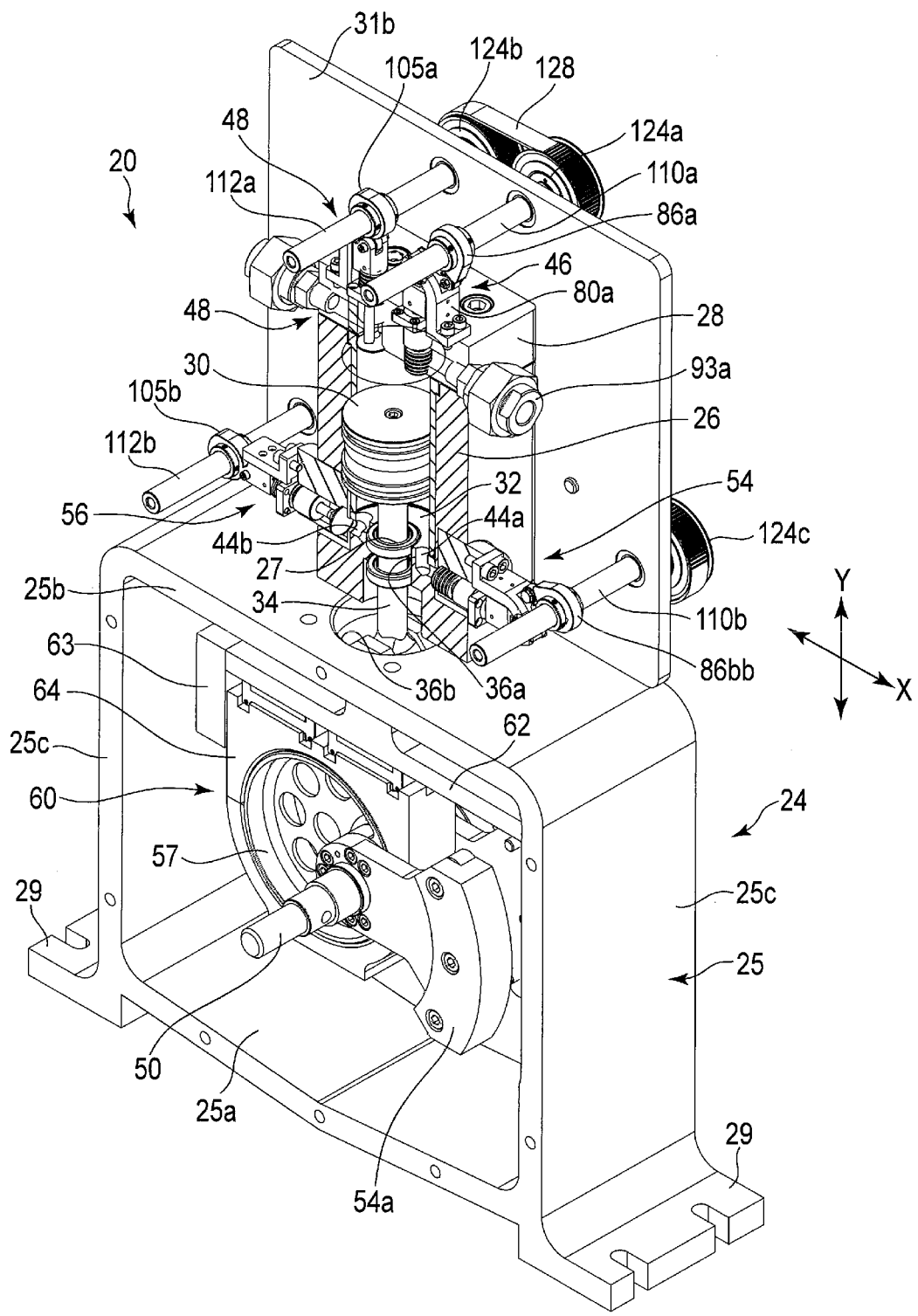
FIG. 4 is a perspective view of the expander, showing an internal structure thereof.

FIG. 2 is a perspective view showing an appearance of the expander, FIG. 3 is a perspective view showing an appearance the expander from back side, FIG. 4 is a perspective view of the expander, showing an internal structure thereof, and FIG. 5 is a front view of the expander.

As shown in FIGS. 2 to 5, the expander 20 comprises a support frame 24, a cylinder 26 attached onto the support frame 24, a cylinder head 28 fixed to the cylinder so as to close an upper end opening of the cylinder 26, a piston 30 arranged to be ascendable/descendable (perpendicularly reciprocative) in the cylinder 26, a plurality of valve mechanisms 40 provided in the cylinder 26 and the cylinder head 28, a drive shaft (crankshaft) 50 rotatably supported by the support frame 24, and an XY-separation crank mechanism 60 which converts the reciprocating motion of the piston into a rotary motion to be transmitted to the crankshaft.

The support frame 24 comprises a rectangular base frame 25 including a pair of legs, a rectangular first base plate 27a detachably attached to a front side of the base frame 25 so as to close a front-side opening of the base frame, a rectangular second base plate 27b fixed to a back side of the base frame so as to close a back side opening of the base frame, and a pair of support plates 31a and 31b to stand on an upper wall of the base frame 25 to face each other in parallel with an interval therebetween. The base frame 25 includes a bottom wall 25a and an upper wall 25b expanding substantially horizontally, and two sidewalls 25c expanding perpendicularly between the bottom wall 25a and the upper wall 25b, which are integrated as one, and a pair of legs 29 formed to have a flange shape in an lower end of each sidewall.

The cylinder 26 is fixed at substantially the center of the upper wall 25b of the base frame 25 and extends upwards from the base frame 25 in a vertical direction. The cylinder head 28 is fixed to the upper end of the cylinder to cover the upper end opening of the cylinder 26. In this embodiment, the cylinder 26 has an outer shape of a prism, and interposed between a pair of support plates 31a and 31b to be supported therebetween.

As shown in FIGS. 4 and 5, a partition 32 is formed near the lower end of the cylinder 26 and the lower-end side opening of the cylinder 26 is closed by the partition 32. In the cylinder 26, the cylindrical piston 30 is arranged to be slidable between the partition 32 and the cylinder head 28. A perimeter of the piston 30 is provided with a plurality of piston rings, and these piston rings are airtightly attached to an inner circumferential surface of the cylinder 26. In the cylinder 26, a first expansion-compression chamber 26a is defined by the piston 30 and the cylinder head 28, and also a second expansion-compression chamber is defined by the piston 30 and the partition 32. The piston 30 ascends and descends the inside of the cylinder 26, that is, reciprocates in a shaft direction (Y-axis direction) of the cylinder 26, to increase and decrease the volume of the first expansion-compression chamber 26a and that of the second expansion-compression chamber 26b alternately, thus establishing the so-called double-action piston.

The piston rod 34 is coupled with the piston 30, or they are formed integrally as one unit. The piston rod 34 extends from the piston 30 into the base frame 25 while passing through a circular first through-hole 36a formed in the partition 32 and a circular second through-hole 36b formed at a center of the upper wall 25b of the base frame 25. The piston rod 34 is formed to be coaxial with the cylinder 26 so as to extend in the vertical direction. Further, for example, two rod gaskets 37 are engaged to the first through-hole 36a of the partition 32, and the piston rod 34 is airtightly put through the rod gaskets 37.

Between the upper end of the cylinder 26 and the cylinder head 28 and between the lower end of the cylinder 26, and the base frame 25, thermal insulation members, for example, thermal-insulating sheets 38 of a fluoro-resin are arranged, respectively. The heat-insulating sheets 38 insulate against heat propagating from the exterior, for example, from the cylinder-head 28 side or the base frame 25 side to the cylinder 26 to maintain the cylinder 26 at low temperature.

As shown in FIGS. 2 to 5, the crankshaft 50 extends in a direction perpendicularly intersecting a referential plane including a central axis (a moving axis, Y-axis) of the piston 30. In this embodiment, both axial ends of the crankshaft 50 are rotatably supported by a first bearing 38a attached to the first base plate 27a of the support frame 24 and a second bearing 38b attached to the second base plate 27b, respectively. Thus, the crankshaft 50 is located at substantially a center of the base frame 25 to extend in an direction perpendicularly intersecting the first and second base plates 27a and 27b, and is rotatably supported by the support frame 24 around an axis perpendicularly intersecting the central axis of the piston 30.

Note that an end of the crankshaft 50 projects outward from the first base plate 27a, and a large-diameter output wheel (flywheel) 52 is attached coaxially to the projecting end. The other end of the crankshaft 50 projects outward from the second base plate 27b and a driving pulley 53 is attached coaxially to the projecting end. Thus, the output wheel 52 and the driving pulley 53 rotate together with the crankshaft 50.

Figure 6:
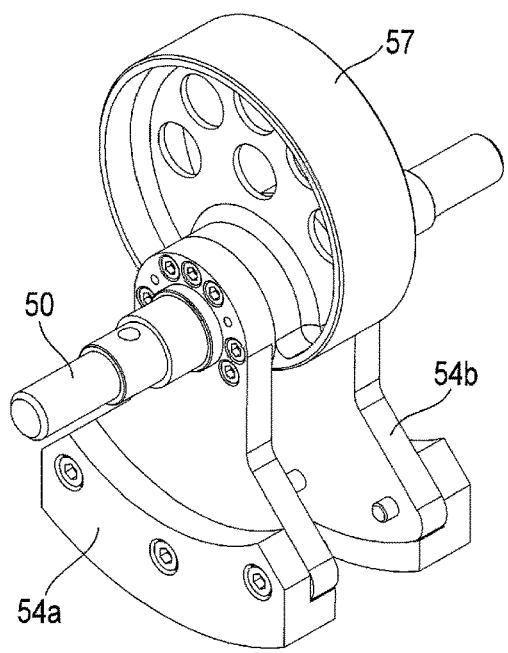
FIG. 6 is a perspective view showing a crankshaft of an XY-separation crank mechanism in the expander.
Figure 7:
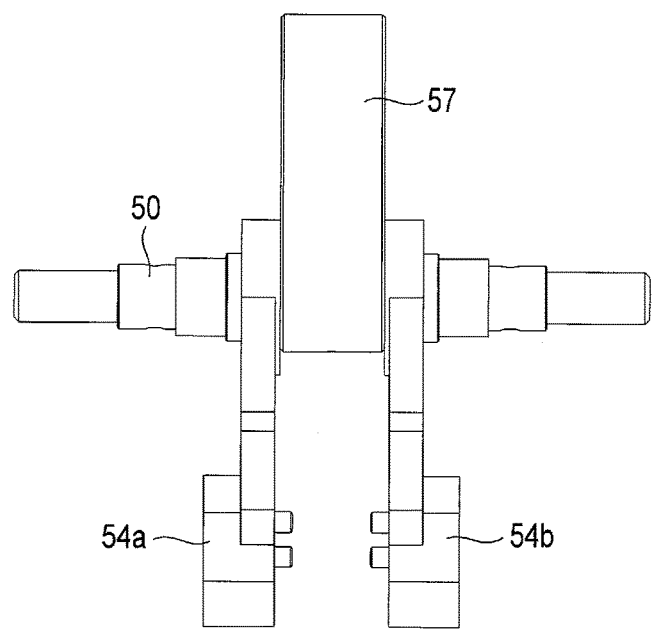
FIG. 7 is a plan view of the crankshaft.
Figure 8:
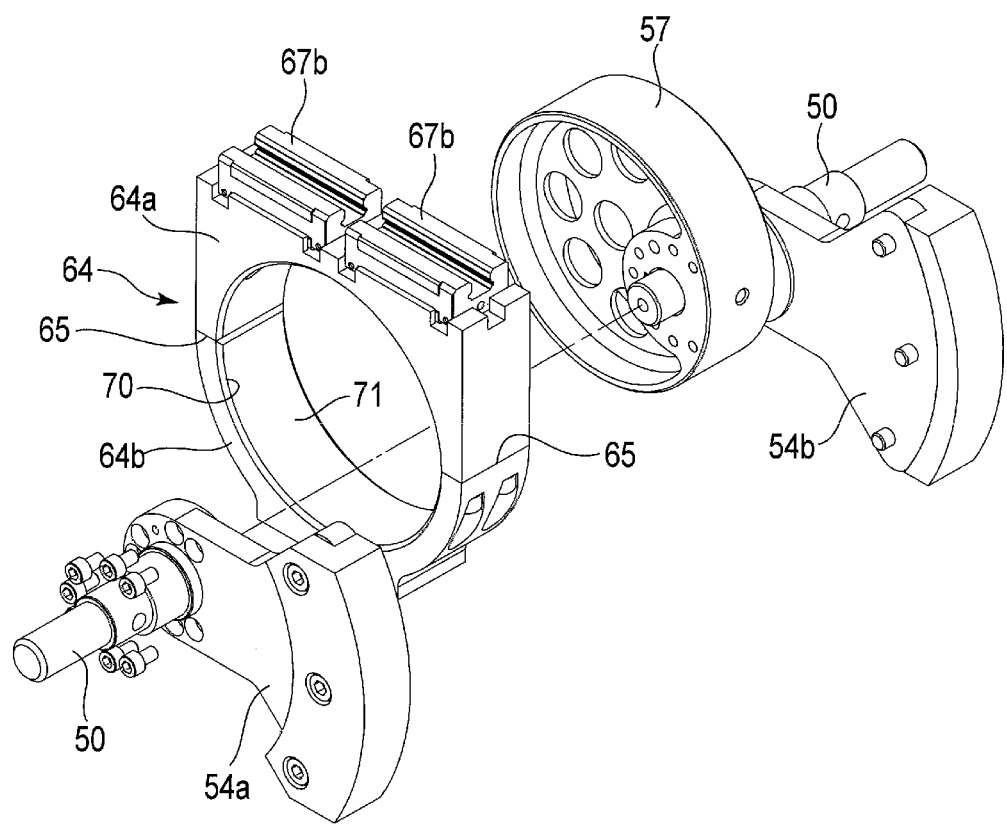
FIG. 8 is an exploded perspective view showing the crankshaft and a crank connection plate.

FIG. 6 is a perspective view showing the crankshaft and the crank wheel, FIG. 7 is a plan view of the crankshaft and the crank wheel, and FIG. 8 is an exploded perspective view showing the crankshaft and a crank connection plate.

As shown in FIGS. 4 to 8, two crank webs (a crank arm and a counter weight) 54a and 54b are fixed in a middle portion of the crankshaft 50, and further a crank wheel 57 which acts equivalently as a crankpin is fixed between the crank webs 54a and 54b. The central axis of the crank wheel 57 is located in parallel to the crankshaft 50 and also eccentrically with respect to the central axis of the crankshaft. Counterweights of the crank webs 54a and 54b are arranged to opposite the crank wheel 57 by 180 degrees. The crank wheel 57 and the crank webs 54a and 54b are arranged in the base frame 25 and they are eccentrically rotate around the crankshaft 50 according to the rotation of the crankshaft 50.

Note that with use of a large-diameter crank wheel as the crankpin, a large amount of eccentricity can be created at the end of the crank wheel, and thus the moving stroke of the piston, which will be described later, can be enlarged.

As shown in FIGS. 4, 5 and 8, the Z-mechanism XY-separation crank mechanism 60 is provided between the piston 30 and the crankshaft 50 to convert the Y-axial reciprocating motion in of the piston 30 into the rotary motion of the crankshaft 50 mutually and vise versa, to be transmitted. In the expander 20 of this embodiment, a driving force is input to the piston 30 by the pressurized air expanding within the cylinder 26, and the piston 30 reciprocates along the Y-axis. The Z-mechanism XY-separation crank mechanism 60 converts the reciprocating motion of the piston 30, which is the driving input, into the rotary motion to be transmitted to the crankshaft 50, thereby applying the rotating output to the crankshaft 50.

The XY separation crank mechanism 60 comprises a support member (L-type combinatory member) 62 provided to be reciprocative along the Y-axis in the reference plane including the central axis (moving axis, Y-axis) of the piston 30, and a crank connection member (crank connection plate) 64 attached to the support member 62 so as to be reciprocative in a second direction (X-axis) intersecting perpendicularly with the Y-axis direction in the reference plane, and a coupling member 66 which couples the piston 30 and the support member 62 with each other. The moving central shaft (Y-axis direction) of the support member 62, the moving central shaft (X-axis direction) of the crank connection member 64, and the moving central shaft (Y-axis direction) of the coupling member 66 are located in the reference plane.

The support member 62 is formed into, for example, an L shape and includes a first support portion 62a extending in the Y-axis direction and a second support portion 62b extending in the X-axis direction from one end (here, the upper end) of the first support portion 62a. A first linear slider 67a is fixed to the first support portion 62a, and a guiderail 68a is fixed to an inner surface of one of the sidewalls 25c of the base frame 25 to extend in the Y-axis direction. The first linear slider 67a is reciprocatively supported and guided to the guiderail 68a. Thus, the first support portion 62a is supported by the base frame 25 reciprocatively in the Y-axis.

A guiderail 68b extending in the X-axis direction is being fixed to the second support portion 62b of the support member 62. Two second linear sliders 67b are attached to the crank connection member 64 so as to be arranged along the X-axis. The second linear sliders 67b are reciprocatively supported and guided to the guiderail 68b. Thus, the crank connection member 64 is supported by the support member 62 reciprocatively along the X-axis. Note that a balance weight (stopper) 63 is fixed to the extending end (the end opposite to the first support portion) of the second support portion 62b.

The first and the second linear sliders 67a and 67b may include ball bearings built therein and rotatably contacting the guiderails, respectively.

The crank connection member 64 is formed, for example, into substantially a ring shape and includes a circular through-hole 70. The crank connection member 64 is formed dividable into a first half portion 64a and a second half portion 64b with a dividing surface 65 including the center of the through-hole 70, and the second half portion 64b is fixed to the first half portion 64a with a screw or the like. The second linear sliders 67b in pair are fixed to a flat part of the first half portion 64a.

The crank wheel 57 of the crankshaft 50 is put through the through-hole 70 of the crank connection member 64 so as to be rotatable via a bearing such as ball bearing or plain bearing 71. Thus, the crank connection member 64 was engaged with the crankshaft 50 to connect the crankshaft 50 and the support member 62 together.

The coupling member 66 is formed to have a slender coupling rod, for example, and one end thereof is coupled with the piston rod 34 through a support pin, and the other end is coupled with the second support portion 20b of the support member 62. In this embodiment, the coupling member 66 is integrated with the support member 62 as one unit. The coupling member 66 extends coaxially with the central axis (moving axis) of the piston 30. The coupling member 66 reciprocates integrally with the support member 62 along the Y-axis to reciprocate the piston 30 along the Y-axis.

The expander 20 including the Z-mechanism XY-separation crank mechanism 60 with the above-described structure operates as follows. That is, as the piston 30 reciprocates along the Y-axis by expansion of the compressed air introduced to the cylinder 26, the reciprocating motion is transmitted to the support member 62 through the piston rod 34 and the coupling member 66 and is separated into a Y-axial movement and an X-axial movement by the XY-separation crank mechanism 60. More specifically, the support member 62 is reciprocated together with the crank connection member 64 along the Y-axis by the first linear slider 67a, and the crank connection member 64 is reciprocated along the X-axis by the second linear slider 67b. Thus, the crank wheel 57 rotates eccentrically around the crankshaft 50 to apply a rotating output to the crankshaft 50.

As shown in FIGS. 2 and 3, for example, the power generator 75 is attached to an outer surface of the sidewall 25c of the base frame 25. An input shaft 75a of the power generator 75 is engaged with the output wheel 52 via a plurality of pulleys or a row of pulleys 91. The rotating output of the crankshaft 50 rotates the output wheel 52 and is input into the power generator 75 via the row of pulleys 91. In other words, the input shaft 75a of the power generator 75 is rotated to generate power.

Next, the valve mechanism of the expander 20 will be described.

As shown in FIGS. 4 and 5, the cylinder head 28 includes a first intake port 42a and a first outlet port 42b which communicate to the first expansion-compression chamber 26a of the cylinder 26. Respective ends of the first intake port 42a and the first outlet port 42b are opened a bottom surface of the cylinder head 28 and the other ends thereof are opened to the both sides of the cylinder head 28, respectively. Further, the partition 32 of the cylinder 26 includes a second intake port 44a and a second outlet port 44b communicating to the second expansion-compression chamber 26b of the cylinder 26. Respective ends of the second intake port 44a and the second outlet port 44b are opened to a top surface of the partition 32 and the other ends are opened to the front surface face side of the cylinder 26, respectively.

The valve mechanism of the expander 20 comprises a first intake-side XY-separation valve mechanism 46 which opens/closes the first intake port 42a, a first outlet-side valve mechanism 48 which opens/closes the first outlet port 42b, a second intake-side XY-separation valve mechanism 54 which opens/closes the second intake port 44a and a second outlet-side valve mechanism 56 which opens/closes the second outlet port 44b.

Figure 9:
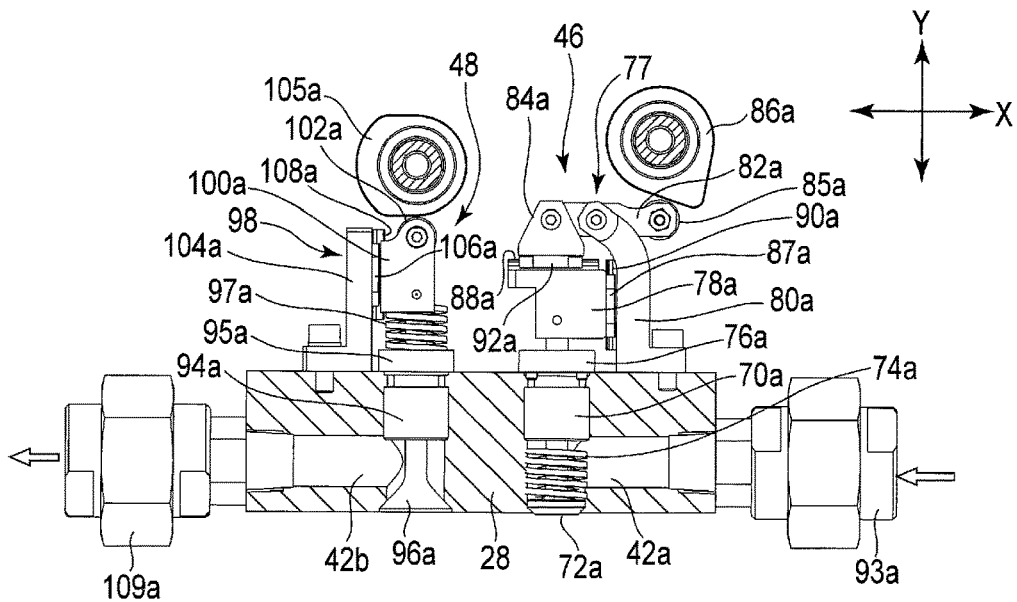
FIG. 9 is a partially cutaway side view of a valve mechanism of the expander.
Figure 10:
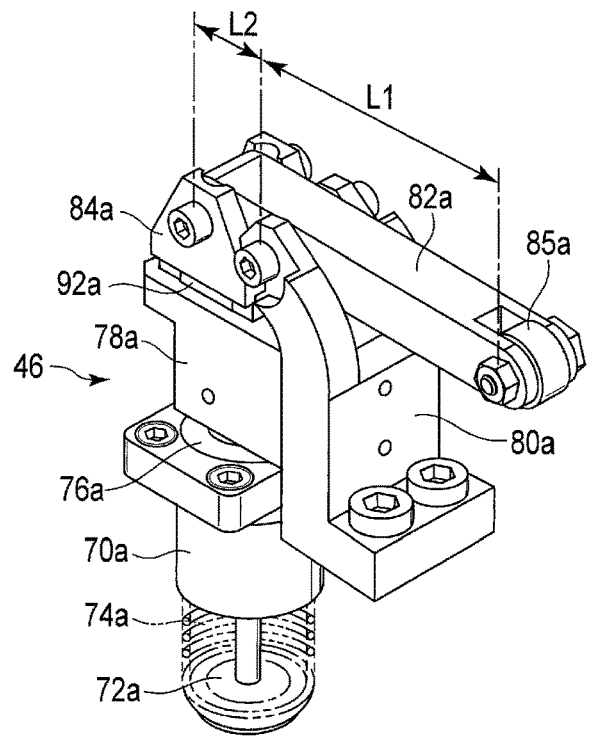
FIG. 10 is a perspective view showing an XY-separation valve mechanism.

FIG. 9 is an enlarged side view of the cylinder head, the first intake-side XY-separation valve mechanism and the first outlet-side valve mechanism, and FIG. 10 is a perspective view showing the first intake-side XY-separation valve mechanism.

As shown in FIGS. 4, 5, 9 and 10, the first intake-side XY-separation valve mechanism 46 comprises a suction valve (for example, a mushroom valve) 72a guided to be ascendable/descendable in the Y-axis direction (third direction) by a valve guide 70a, which opens/closes an opening of the first intake port 42a on the side of the first expansion-compression chamber 26a, a coiled spring (for example, helical compression spring) 74a which urges the suction valve 72a toward the close position side, and an XY-separation drive mechanism 77 coupled with a stem-extending end of the suction valve 72a, which drives the suction valve 72a to open/close. The stem of the suction valve 72a is airtightly put through a ceiling 76a and projects upward from the cylinder head 28.

The XY-separation drive mechanism 77 comprises a Y-axis separation slider (combinatory member) 78a fixed to the stem extending end of the suction valve 72a and movable in the Y-axis direction together with the suction valve 72a as one unit, a fulcrum hinge 80a provided to stand on the cylinder head 28 and extend in the Y-axis direction, a rocker arm 82a swingably supported by an extending end of the fulcrum hinge 80a, an X-axis separation slider (power-point block) 84a swingably supported by one end (power point) of the rocker arm 82a, a cam follower (roller) 85a rotatably supported by the other end (point of action) of the rocker arm 82a, and a first intake cam 86a rotatably supported by the support frame 24 and rotatably contacting the cam follower 85a.

The Y-axis separation slider 78a is formed into, substantially, a rectangular block shape, and includes side surfaces expanding in the Y-axis direction and a top surface expanding in the X-axis direction. The Y-axis linear slider 87a extending in the Y-axis direction is fixed on the side surface of the Y-axis separation slider 78a or it is formed integrally with the Y-axis separation slider 78a as one unit. The X-axis guiderail 88a extending in the X-axis direction is fixed to the top face of the Y-axis separation slider 78a. Further, the Y-axis guiderail 90a extending in the Y-axis direction is fixed on a side surface of the fulcrum hinges 80a, which opposes the Y-axis separation slider 78a. The Y-axis linear slider 87a of the Y-axis separation slider 78a is guided and supported by the Y-axis guiderail 90a so as to be slidable along the Y-axis. Furthermore, the X-axis linear slider 92a is fixed to the bottom surface of the X-axis separation slider 84a, which opposes the Y-axis separation slider 78a, or it is formed integrally with the X-axis separation slider 84a as one unit. The X-axis linear slider 92a is guided and supported by the X-axis guiderail 88a of the Y-axis separation slider 78a so as to be slidable in the X-axis direction.

Note that the Y-axis linear slider 87a and the X-axis linear slider 92a may each include a built-in ball bearing rotatably contacting the respective guiderail.

The extending end portion (upper end portion) of the fulcrum hinges 80a is curved towards the Y-axis separation slider 78a (XC-axis separation slider 84a side) with respect to the Y-axis direction. Therefore, the rocker arm 82a is swingably supported by the fulcrum hinge 80a on a power-point side with respect to the longitudinal central portion, that is, on a side of the X-axis separation slider 84a. For this reason, a distance L1 between the power point (the cam follower) and the fulcrum is set to be sufficiently greater than a distance L2 of the fulcrum and power point (engaging position of the X-separation slider 84a and the rocker arm 82a) (L1>L2). Thus, a large leverage ratio (L1/L2) is obtained for the rocker arm 82a, and with a comparatively small power action at the point of application, the X-axis separation slider 84a, the Y-axis separation slider 78a, and the suction valve 72a can be easily pulled up.

A first intake-side coupler 93a is fitted to an intake-side end opening of the intake port 42a. A pipe (supply line) from the secondary cooler 18 is connected to the first intake-side coupler 93a to guide low-temperature, high-pressure air to the first intake port 42a from the secondary cooler 18.

For closing, the first suction valve 72a is urged by the coil spring 74a so as to descend and tightly attach to the seat (valve seat) of the first intake port 42a, thereby closing the first intake port 42a.

The first intake cam 86a rotates to push the cam follower 85a of the rocker arm 82a downward at a predetermined timing. The rocker arm 82a pivots clockwise around the fulcrum, whereas the X-axis separation slider 84a pivots upwards. Thus, the X-axis separation slider 84a pulls up the Y-axis separation slider 78a and the suction valve 72a upwards along the Y-axis, and simultaneously slides in the X-axis direction with respect to the Y-axis separation slider 78a. That is, the rotating motion of the X-axis separation slider 84a is divided into a Y-axis movement and an X-axis movement and only the Y-axis movement is transmitted to the Y-axis separation slider 78a. Thus, the Y-axis separation slider 78a and the first suction valve 72a reciprocate along the Y-axis by the Y-axis linear slider 87a to open/close the first intake port 42a.

Note that if the first intake cam 86a further rotates, the cam follower 85a is brought into rotatable contact with a small-diameter portion of the first intake cam 86a to reduce the pressure by the intake cam 86a. Therefore, with the urging force of the coil spring 74a, the first suction valve 72a and the Y-axis separation slider 78a are moved downward in the Y-axis direction to close the first intake port 42a. Meanwhile, the rocker arm 82a pivots in the counter-clockwise direction, and the X-axis separation slider 84a moves downward together with the Y-axis separation slider 78a, while sliding in the to X-axis direction.

As shown in FIGS. 4, 5 and 9, the first outlet-side valve mechanism 48 includes a discharge valve (for example, a mushroom valve) 96a ascendably/descendably guided along the Y-axis (third direction) by a valve guide 94a embedded in the cylinder head 28. A stem of the discharge valve 96a is airtightly put through the ceiling 95a so as to project upwards from the cylinder head 28. The discharge valve 96a ascends/descends in the Y-axis direction to open/close the end opening of the first outlet port 42b, which is on the side of the first expansion-compression chamber 26a.

The first outlet-side valve mechanism 48 includes a slide drive mechanism 98 coupled with a coiled spring (for example, helical compression spring) 97a which urges the discharge valve 96a towards the close position side and with the stem extending end of the discharge valve 96a, to open/close the discharge valve 96a. The slide drive mechanism 98 comprises a Y-axis slider 100a fixed to the stem extending end of the discharge valve 96a to moves in the Y-axis direction integrally with the discharge valve 96a as one unit, a cam follower (roller) 102a rotatably attached to the Y-axis slider 100a, a slide holder 104a provided to stand on the cylinder head 28 and extend in the Y-axis direction, and a first outlet cam 105a rotatably supported by the support frame 24 and rotatable contacting the cam follower 102a.

The Y-axis slider 100a is formed into substantially a rectangular block shape and includes a side surface expanding in the Y-axis direction. A Y-axis linear slider 106a expanding in the Y-axis direction is fixed on a side surface of the Y-axis slider 100a or is formed integrally with the Y-axis slider 100a as one unit. Further, a Y-axis guiderail 108a extending in the Y-axis direction is fixed on a side surface of the slide holder 104a, which opposes the Y-axis slider 100a. The Y-axis linear slider 106a of the Y-axis slider 100a is slidably guided and supported by the Y-axis guiderail 108a in the Y-axis direction. The Y-axis linear slider 106a may include a built-in ball bearing rotatably contacting the Y-axis guiderail 108a.

Note that a first exhaust-side coupler 109a is fitted to an outlet-side end opening of the first outlet port 42b. A pipe (discharge line) is connected to the first exhaust-side coupler 109a to send therethrough the cold air discharged from the expander 20 to the freezer 22.

For closing, the first discharge valve 96a and the Y-axis slider 100a are urged by the coil spring 97a an thus the first discharge valve 96a ascends and tightly attaches to the seat (valve seat) of the first outlet port 42b, thereby closing the first outlet port 42a. The first outlet cam 105a rotates to push the cam follower 102a of the Y-axis slider 100a downward at a predetermined timing. Thus, the Y-axis slider 100a slides downward along the Y-axis to move the first discharge valve 96a downward along the Y-axis therewith, to open the first outlet port 42b.

If the first outlet cam 105a further rotates, the cam follower 102a is brought into rotatable contact with a small-diameter portion of the first outlet cam 105a. Therefore, with the urging force of the coil spring 97a, the first discharge valve 96a and the Y-axis slider 100a are moved upward along the Y-axis, and the first discharge valve 96a closes the first outlet port 42b.

As shown in FIGS. 4 and 5, the second intake-side XY-separation valve mechanism 54 which opens/closes the second intake port 44a has a structure similar to that of the first intake-side XY-separation valve mechanism 46 described above except the following. That is, the first intake-side XY-separation valve mechanism 46 has the so-called vertical structure in which the first suction valve and the Y-axis separation slider ascend/descend along the Y-axis, whereas the second intake-side XY-separation valve mechanism 54 has the so-called horizontal structure in which the second suction valve and the separation slider reciprocate along the X-axis.

More specifically, the second intake-side XY-separation valve mechanism 54 comprises a second suction valve (for example, a mushroom valve) 72b guided reciprocatively along the X-axis (the fourth direction) by the valve guide, to open/close the end opening of the second intake port 44a, on the side of the second expansion-compression chamber 26b, a coiled spring (for example, a compression spring) 74b which urges the second suction valve 72b toward the close position side, and an XY separation drive mechanism coupled with the stem extending end of the second suction valve 72b, to open/close the second suction valve 72b. The stem of the second suction valve 72b is airtightly put through the ceiling 76b, to project to a side of the cylinder 26.

The XY separation drive mechanism comprises an X-axis separation slider (combinatory member) 78b fixed to the stem extending end of the second suction valve 72b so as to be movable along the X-axis therewith as one unit, a fulcrum hinge 80b provided to stand on the cylinder 26 and extend in the X-axis direction, a rocker arm 82b swingably supported by the extending end of the fulcrum hinge 80b, a Y-axis separation slider (power point block) 84b swingably supported by one end (power point) of the rocker arm 82b, a cam follower (roller) 85b rotatably supported by the other end (point of application) of the rocker arm 82b and a second intake cam 86b rotatably supported by the support frame 24 and rotatably contacting the cam follower 85b.

The X-axis linear guide of the X-axis separation slider 78b is guided and supported slidably along the X-axis by an X-axis guiderail attached to the fulcrum hinge 80b. The Y-axis linear slider of the Y-axis separation slider 84b is guided and supported slidably along the Y-axis by a Y-axis guiderail of the X-axis separation slider 78b.

A second intake-side coupler 93b (see FIG. 2) is fitted to the intake-side end opening of the second intake port 44a. A pipe (supply line) from the secondary cooler 18 described above is connected to this second intake-side coupler 93b and low-temperature, high-pressure air is guided to the intake port 44a from the secondary cooler 18.

The second intake-side XY-separation valve mechanism 54 which has the above-described structure operates in a similar fashion to that of the first intake-side XY-separation valve mechanism 46 described above, to open/close the second intake port 44a.

As shown in FIG. 4 and FIG. 5, the second outlet-side valve mechanism 56 which opens/closes the second outlet port 44b has a stricture similar to that of the first outlet-side valve mechanism 48 described above. But, the first outlet-side valve mechanism 48 has the so-called vertical structure in which the first discharge valve and the Y-axis slider ascend/descend along the Y-axis, whereas the second outlet-side valve mechanism 56 has the so-called horizontal structure in which the second discharge valve and the X-axis slider reciprocate along the X-axis.

More specifically, the second outlet-side XY-separation valve mechanism 56 comprises a second discharge (for example, a mushroom valve) 96b guided reciprocatively along the X-axis (the fourth direction) by the valve guide embedded in the cylinder 26. The stem of the discharge valve 96b is airtightly put through the ceiling, to project to a side of the cylinder 26. The discharge valve 96b reciprocates along the X-axis to open/close the end opening of the second outlet port 44b, located on the side of the second expansion-compression chamber 26b.

The second outlet-side valve mechanism 56 comprises a coiled spring (for example, a compression spring) 97b which urges the discharge valve 96b toward the close position side, and a slide drive mechanism coupled with the stem extending end of the discharge valve 96b to open/close the discharge valve 96b. The slide drive mechanism comprises an X-axis slider 100b fixed to the stem extending end of the discharge valve 96b to be movable along the X-axis integrally with the discharge valve 96b as one unit, a cam follower (roller) rotatably attached to the X-axis slider 100b, a slide holder 104b provided to stand on the cylinder 26 so as to extend in the X-axis direction and a second outlet cam 105b rotatably supported by the support frame 24 and rotatably contacting the cam follower. The X-axis linear slider of the X-axis slider 100b is guided and supported slidably along the X-axis by the X-axis guiderail provided in the slide holder 104b to extend in the X-axis direction.

A second outlet-side coupler 109b (see FIG. 2) is fitted to the outlet-side end opening of the second outlet port 44b. A pipe (discharge line) is connected to the second outlet-side coupler 109b to send therethrough the cold air discharged from the expander 20 to the freezer 22.

The second outlet-side valve mechanism 56 having the above-described structure operates in a similar manner to that of the first outlet-side valve mechanism 48 described above, to open/close the second outlet port 44b.

As shown in FIGS. 2 to 5, a plurality of camshafts are rotatably attached to the support frame 24, and various cams described above are attached to the camshafts, respectively. More specifically, a first intake camshaft 110a and a first outlet camshaft 112a are supported rotatably by a pair of support plates 31a and 31b of the support frame 24. The first intake camshaft 110a and the first outlet camshaft 112a are provided above the cylinder head 28 to be parallel to each other. The first intake cam 86a is fixed to the first intake camshaft 110a so as to rotate integrally with the camshaft as one unit. The first outlet cam 105a is fixed to the first outlet camshaft 112a so as to rotate integrally with the camshaft as one unit.

One end portion of the first intake camshaft 110a and one end portion of the first outlet camshaft 112a project from the support plate 31b toward the back side. A first driven pulley 124a and a second driven pulley 124b are attached to these end portions, respectively, to be rotatable integrally with the camshafts as one unit.

A second intake camshaft 110b and a second outlet camshaft 112b are rotatably supported by the pair of support plates 31a and 31b of the support frame 24. The second intake camshaft 110b and the second outlet camshaft 112b are provided respectively in both sides of the cylinder 26 to be in parallel to each other. The second intake cam 86b is fixed to the second intake camshaft 110b so as to rotate integrally with the camshaft as one unit. The second outlet cam 105b is fixed to the second outlet camshaft 112b so as to rotate integrally with the camshaft as one unit.

One end portion of the second intake camshaft 110b and one end portion of the second outlet camshaft 112b project from the support plate 31b toward the back side. A third driven pulley 124c and a fourth driven pulleys 124d are attached to these end portions, respectively, to be rotatable integrally with the camshafts as one unit.

A plurality of tension pulleys 126 are rotatably attached to the back side of the support plate 31b, and the back side of the second base plate 27b. A loop-like timing belt 128 is fasten over first to fourth driven pulleys 124a to 124d, four tension pulleys 126, and a passive belt pulley 53 attached to the crankshaft.

When the driving pulley 53 rotates along with the crankshaft 50, the first to fourth driven pulleys 124a to 124d are rotated synchronously by the timing belt 128. Thus, the first and second intake camshafts 110a and 110b and the first and second outlet camshafts 112a and 112b rotate, and along with these camshafts, the first and second intake cams 86a and 86b and the first and second outlet cams 105a and 105b rotate to open/close the valves of the respective valve mechanisms at a predetermined cycle and timing.

According to the expander 20 having the structure described above, the crankshaft 50 is rotated with a motor or the like, which is not shown in the drawings, at the time of start up, to ascend/descend the piston 30. For example, as shown in FIG. 5, when the piston 30 ascends to an upper dead center, the first suction valve 72a is opened to supply the low-temperature, high-pressure air from the first intake port 42a into the first expansion-compression chamber 26a. After the first suction valve 72a is closed, as the piston 30 descends toward a lower dead center, the volume of the first expansion-compression chamber 26a increases gradually, and accordingly, the low-temperature, high-pressure air inside adiabatically expands. Thus, the air is cooled to a cryogenic temperature of −80 to −100° C. When the piston 30 moves from the lower dead center toward the upper top dead center, the first discharge valve 96a is opened and the cooling air (cold air) in the first expansion-compression chamber 26a is pushed with the piston 30, to be discharged to the pipe from the first outlet port 42b and the first discharge coupler 109a. The discharged cooling air is emitted into the freezer 22 through the pipe to cool the inside of the freezer 22.

In the meantime, when the piston 30 moved to the lower dead center, the second suction valve 74b is opened to supply the low-temperature, high-pressure air to the second expansion-compression chamber 26b from the second intake port 44a. After the second suction valve 74b is closed, as the piston 30 ascends toward the upper dead center, the volume of the second expansion-compression chamber 26b increases gradually, and accordingly, the low-temperature and high-pressure inside adiabatically expands. Thus, the air is cooled to a cryogenic temperature of −80 to −100° C. When the piston 30 moves from the lower dead center toward the upper dead center, the second discharge valve 96b is opened, and the cooling air (cold air) in the second expansion-compression chamber 26b is pushed with the piston 30 to be discharged to the pipe from the second outlet port 44b and the second intake coupler 109b. The discharged cooling air is emitted into the freezer 22 through the pipe to cool the inside of the freezer 22.

Part of the cold air discharged from first and second outlet ports 42b and 44b is sent to the secondary cooler 18 through the control valve 23.

After the start of the expander 20, the piston 30 is driven by the low-temperature, high-pressure air, and its reciprocating motion is converted into rotary motion with the XY separation crank mechanism 60, to rotate the crankshaft 50. That is, the crankshaft 50 is rotated by the expansive power of high-pressure air, and the power generator 75 is driven by this turning force to obtain the regenerative power.

According to the expander 20 having the structure as described above, the reciprocating motion of the piston can be converted into rotary motion by the XY separation crank mechanism, to be transmitted to the crankshaft. Therefore, as compared to the mechanism using a swinging connecting rod (coupling rod) or a slider crank, the side thrust loss (friction loss) and vibration of the piston or cylinder can be greatly suppressed. Since there is no friction loss, the vibration can be suppressed to low, thereby enabling a high-speed operation. At the same time, there is no heat loss by the side thrust loss, thereby making it possible to significantly improve the efficiency, and also to easily make the structure smaller. According to this embodiment, with use of the double-acting pistons and cylinders, the volume becomes twice as much to have a better efficiency, and therefore an effect of 3 times higher than usual cases can be expected.

Even if double-acting piston and cylinder are used, the power is transmitted by the Z-mechanism XY-separation crank mechanism and the direct-acting connection member. But the cylinder part and the crank part can be detached from each other, and therefore it is easy to provide a thermal insulator in a gap therebetween, thereby making it possible to minimize the heat transfer. Thus, the heat loss can be reduced further to improve the efficiency even further. Moreover, with use of double-acting piston and cylinder, the space factor is reduced to a half, thereby making it easy to make the expander smaller.

With use of an XY-separation valve mechanism as the valve mechanism, the side thrust acting on the valve can be eliminated to be able to reduce the heat loss caused by friction loss and avoid deformation of the valve by the side thrust itself. The valve operations an exact linear motion by the linear guide of the valve-opening/closing directions, and thus the valve and the valve seat tightly attach to each other with precision, thereby improving the sealing properties and realizing a precise opening-and-closing operation. Further, the valve mechanism can achieve high efficiency and excellent durability. When the working oil of the valve also serves as lubricating oil, it is easy to stop unnecessary rotation of the valve, and the valve can be easily made into a type of solenoid-type electromagnetic mechanism.

Thus, with the XY-separation valve mechanism, the cooling air can be supplied and discharged precisely and at high speed with high sealing properties. Thus, the expansion rate and air cooling efficiency of the expander can be further improved. For example, it is also easy to make the compression-expansion ratio 10 times higher or more, and therefore the cooling by −100° C. can be achieved by one stage.

Compared to the turbine-type expander, the expander of this embodiment can obtain a larger expansion ratio, and therefore various adjustment mechanisms including the bypass can be simplified. Further, the device can be freely designed from a large- to a small-size type. The rotation of the expander can be arbitrarily changed to be able to easily adjust the temperature. It can be manufactured at low cost and rigid as compared to the turbine type.

The expansion work of the expander is recoverable as regeneration energy with a power generator, for example. Since the expansion energy can be used as the load at a ratio of 1:1, the energy can be collected substantially 100% while generating the cold air. For example, with an expander having 700 W of shaft horsepower, it has been actually monitored that a recovery power of 500 W was achieved.

With the Z-mechanism XY-separation crank mechanism and the XY-separation valve mechanism, the piston and valve can be operated in a perfect parallel motion. Therefore, when using a small piston of about 30 mm diameter (φ) or a large-sized piston of 500 mm diameter, excellent sealing properties can be achieved, thereby realizing a lossless and efficient operation. Moreover, it is easy to remodel it into a multistage type, achieving high flexibility to arbitrarily remodel into a 2-, 3- or 8-cylinder type. Further, since there is no side thrust loss, it is possible to manufacture the piston and the valve easily from ceramics. With ceramics, it is possible to reduce the weight of the device and also improve the thermal insulating properties.

With the expander of this embodiment, it is possible to simplify the structure as compared to the conventional air refrigeration device, thereby making it possible to provide a low-cost air refrigeration device. For producing a general-use room air conditioner, the chiller is no longer necessary inside the air conditioner, but only an air outlet for mixed air with the room temperature air is required, thereby making it possible to miniaturize the air conditioner.

According to the air refrigeration device of this embodiment, when the compressor pressurizes to 1 MPa, the room-temperature air become to have 200° C., and thus the viruses and bacteria in the air can be easily destroyed for sterilization. Since the sterilization of viruses and bacteria is easy, a clean room can be easily prepared. For operating rooms or semiconductor-factories, the filter can be miniaturized, thereby making it possible to reduce the total cost. Further, since the cold air is discharged from the expander into the freezer, the inside of the freezer has a positive pressure and therefore the air does not enter the freezer from the exterior. Therefore, if the freezer is formed to have such a simple structure, a sufficient refrigeration function can be exhibited. Thus, the manufacturing cost of the freezer can be significantly reduced.

Next, an air refrigeration device according to another embodiment will now be described. Note that in this embodiment described below, the same structural parts as those of the first embodiment will be designated by the same referential symbols, and detailed descriptions therefor will be omitted. Mainly, different aspects from those of the first embodiment will be explained in detail.

Second Embodiment

FIG. 11 is a block diagram schematically showing an air refrigeration device according to the second embodiment. As shown in this figure, according to the second embodiment, an air refrigeration device 11 comprises a compressor 12 with an entry-side filter 10 provided in an air-intake side, a primary cooler (heat exchanger) 14 connected to an outlet side of the compressor 12, a drier 16, a secondary cooler (heat exchanger) 18 connected to an outlet side of the drier 16, an expander 20 which cool the cold air sent from the secondary cooler by adiabatic expansion and a refrigerating unit 200 connected to an outlet side of the expander 20. That is, the second embodiment comprises a refrigerating unit 200 in pace of a freezer and the cold air discharged from the expander 20 is directly supplied to the refrigerating unit 200.

The expander 20 has a structure similar to that of the first embodiment described above.

In the air refrigeration device 11, indoor or outdoor natural air is taken through the filter 10 into the compressor 12, where it is adiabatically compressed into high-temperature, high-pressure air of about 7 to 10 atmospheres, and then discharged from the compressor 12. After the compression the high-temperature, high-pressure air is sterilized by its own heat. Subsequently, the high-temperature, high-pressure air is sent to the primary cooler 14, where it is cooled by room temperature air to room temperature, and then subjected to removal of water content by the drier (chemical drier, a membrane dryer or the like) 16 in moisture. Furthermore, the air is cooled down to a negative temperature zone by the secondary cooler 18, into low-temperature, high-pressure dry air of about 7 to 10 atmospheres.

The low-temperature, high-pressure air sent from the secondary cooler 18 is taken into the expander 20, where it is adiabatically expanded into a cold air of even lower temperature, for example, of $-100°$ C. The cold air (positive-pressure cold air) is discharged from the expander 20 to be supplied to the refrigerating unit 200. Excessive cold air in the refrigerating unit 200 is allowed pass therethrough and then, it is released out to the space where the unit is placed (working room).

Next, the refrigerating unit 200 according to this embodiment will be described in detail.

Figure 12:
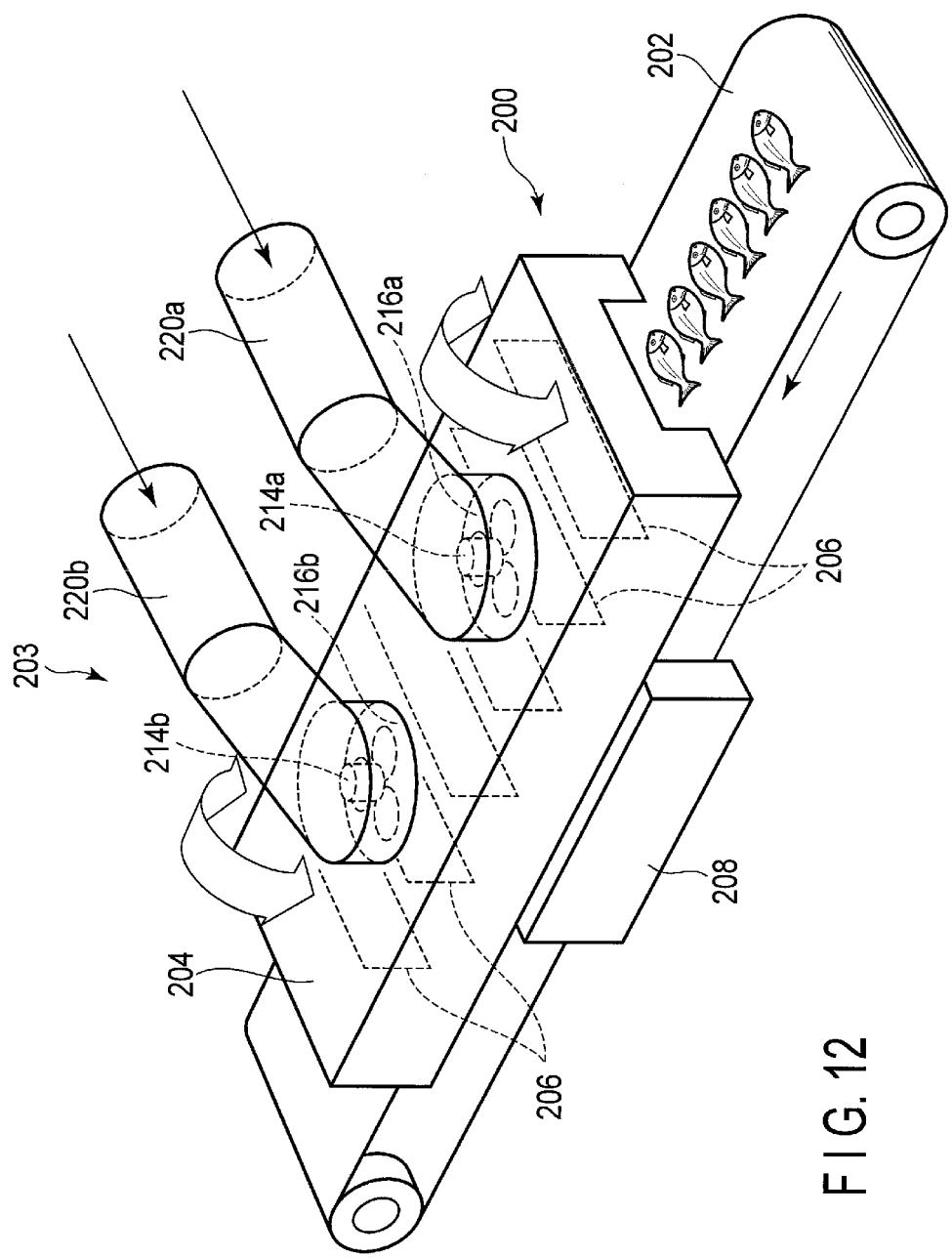
FIG. 12 is a perspective view showing the refrigerator of the air refrigeration device according to the second embodiment.
Figure 13:
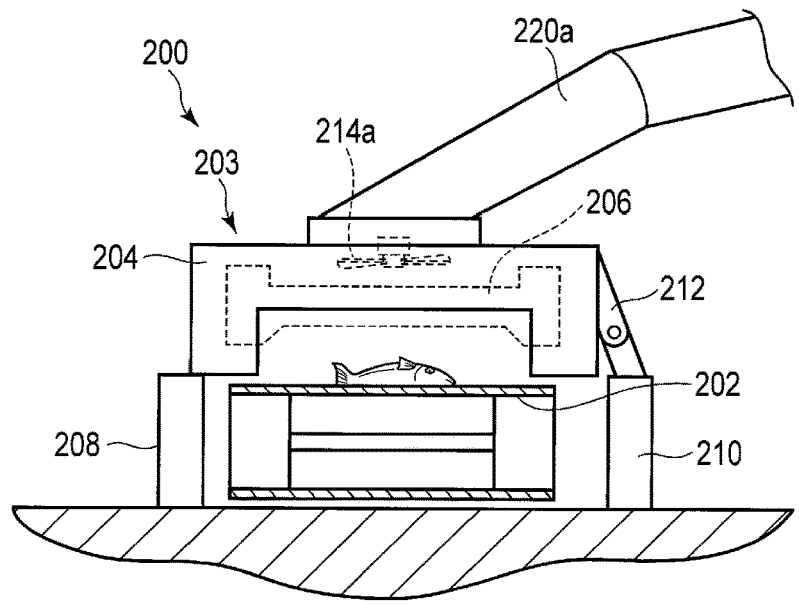
FIG. 13 is a side view of the refrigerator.
Figure 14:
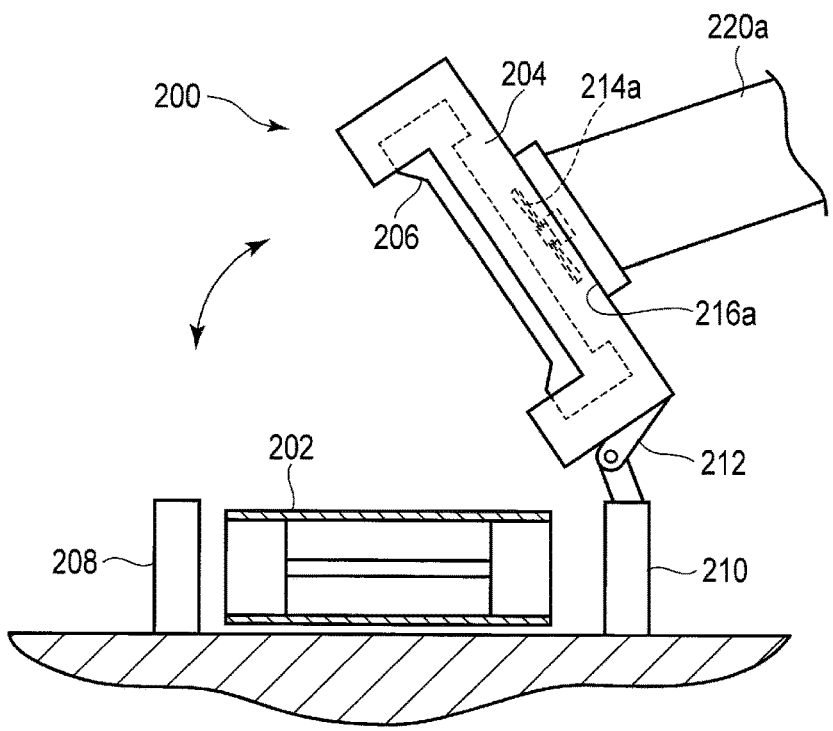
FIG. 14 is a side view of the refrigerator with a cover being opened.

FIG. 13 is a perspective view showing a refrigerating unit, and FIG. 14 is a side view of the refrigerating unit of FIG. 12.

As shown in FIGS. 12 and 13, the refrigerating unit 200 comprises a belt conveyor 202, which is a conveying line which convey, for example, items to be cooled, such as perishable foods and frozen foods, and a cooler 203 placed to cover at least a part of the belt conveyor 202. The cooler 203 comprises two support stands 208 and 210 set on both sides of the belt conveyor 202 and a cooling cover 204 pivotably supported by the support stand 210 with a hinge 212. The cooling cover 204 is pivotably supported between a cooling position to cover the belt conveyor 202 as shown in FIG. 13 and an open position to uncover the belt conveyor 202 as shown in FIG. 14.

In the cooling cover 204, a plurality of current plates 206 are formed. A plurality of, for example, two supply holes 216a and 216b are formed in the cooling cover 204 and the air-blow fans 214a and 214b are provided in the supply holes, respectively. Further, air-pipes 220a and 220b are connected to the supply holes 216a and 216b, respectively. The air-pipes 220a and 220b are formed flexibly and connected respectively to the first outlet-side coupler 109a and the second outlet-side coupler 109b of the expander 20, described above, through a discharge line.

The cold air discharged from the expander 20 is supplied into the cooling cover 204 through the air-pipes 220a and 220b and is further blown onto items to be cooled, on the belt conveyor 202 by the air-blow fans 214a and 214b. Thus, the cooling air of $-80$ to $-100°$ C. is directly applied to the items to be cooled, to be able to freeze the items immediately.

Further, the cooling cover 204 is pivotable to the open position. For cleaning, the cooling cover 204 is opened, and the inner side of the cover, the upper surface of the belt conveyor 202 and the like can be easily cleaned.

According to the air refrigeration device having the structure described above, items to be cooled can be easily frozen using the refrigerating unit 200 which has a comparatively simple structure. Further, the location of the refrigerating unit 200 may not necessarily be in the freezer or freezer compartment, but it may be freely installed. In addition, the second embodiment can exhibit an effect similar to that of the first embodiment.

Third Embodiment

FIG. 15 schematically shows an air refrigeration device according to the third embodiment. As shown in this figure, the air refrigeration device comprises an expander 20 which has the same structure as that of the first embodiment, a compressor 12, an engine 300, a heat exchanger 306 and a power generator 75 connectable with an output side of the expander 20.

In this embodiment, the compressor 12 has the same structure as that of the expander 20 except that the timing for opening/closing of the valve mechanisms 46, 48, 54, and 56 is set appropriately so that it can exhibit the function as a compressor.

The engine 300 has the same structure as that of the expander 20. The engine 300 comprises a first ignition plug 302 which ignites the first expansion-compression chamber of the cylinder 26 and a second ignition plug 304 which ignites the second expansion-compression chamber of the cylinder 26. Further, the timing for opening/closing of the valve mechanisms 46, 48, 54, and 56 is set appropriately so that it can exhibit the function as an engine.

The crankshaft 50 of the expander 20 is selectively connected to the power generator 75 by a first clutch 308. The power generator 75 is selectively connected to the crankshaft 50 of the engine 300 by a second clutch 310. Further, the output shaft (crankshaft 50) of the compressor 12 is selectively connected to the crankshaft 50 of the engine 300 by a third clutch 312. The heat exchanger 306 is connected to an outlet side of the engine 300. An electric apparatus, for example, a lighting apparatus 320 is connectable to the power generator 75.

The air refrigeration device having the structure described above can be operated in various modes by switching the first to third clutches 308, 310 and 312.

When the first clutch 308 is on, the second clutch 310 is off and the third clutch 312 is on, the air refrigeration device simultaneously generates power while in the air refrigeration mode. More specifically, the low-temperature, high-pressure air is supplied from the compressor 12 to the expander 20, where cryogenic air is generated to be discharged. Simultaneously, with the regenerative energy of the expander 20, the power generator 75 is driven to generate power. The generated power is supplied to the lighting apparatus 320, for example. Further, by driving the engine 300, the compressor 12 can be driven by using the output of the engine 300.

When the first clutch 308 is off, the second clutch 310 is on and the third clutch 312 is off, the air refrigeration device operates in a power generation mode. More specifically, the power generator 75 is driven by the output of the engine 300 to generate power. When electrical power is required but the freezing or refrigeration is not, the priority can be given to the power.

With some other heat sources including a boiler and the like in the above-described structure, both of cooling and warming can be performed efficiently. Therefore, when the air refrigeration device of this embodiment is added to a conventional type of co-generator unit, the cooling, warming and power generation can be performed all at high efficiency. Alternatively, a power generator may be attached to the expander which has a Z-mechanism XY-separation mechanism, and a power generator may be attached also to the engine 300. The power generator can be handled as a load approximately equivalent to a flywheel, unless the electromagnet is turned off and the load is not applied. But by switching with clutches, the equipment can be miniaturized. If the system includes two power generators, the degree of freedom is further improved.

According to the air refrigeration device, 2.5 Kw is generated per cooling device, and there are three sets of cooling device, which makes a total of 7.5 Kw, by which the heat source for the gas, etc. of the engine 300 and the compressor 12 can be saved. Since 2.5 Kw is generated automatically, when consuming 1 Kw, a difference of 1.5 Kw of electricity can be sold to a utility.

For example, in oil-producing countries, gas can be converted directly into cooling and power generation. Here, if there are 100,000 houses, 75 Kw can be saved per unit, and 250,000 Kw is generated, which is equivalent to one unit of nuclear power plant of one million Kw. Furthermore, the GDP value (global warming index) is decreased from 8500 of chlorofluocarbon to 1, which is significantly advantageous for global environment.

Such cooling or cooling area is not only for ordinary households, but can improve the efficiency of a wide range of industries including the semiconductor manufacture and the electrochemical fields.

Fourth Embodiment

Next, an expander according to the fourth embodiment will be described.

Figure 16:
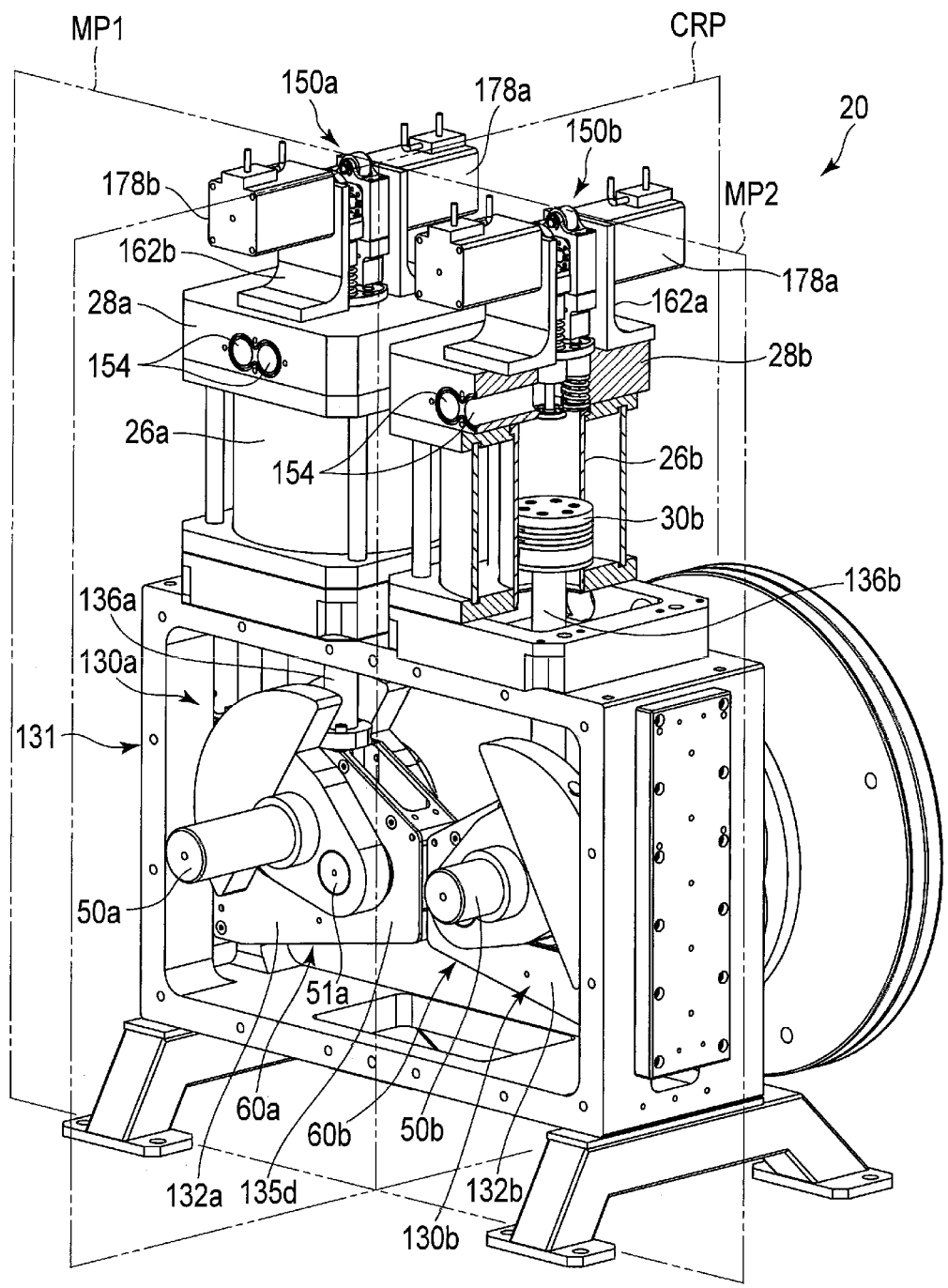
FIG. 16 is a perspective view showing an appearance of an expander according to the fourth embodiment.
Figure 17:
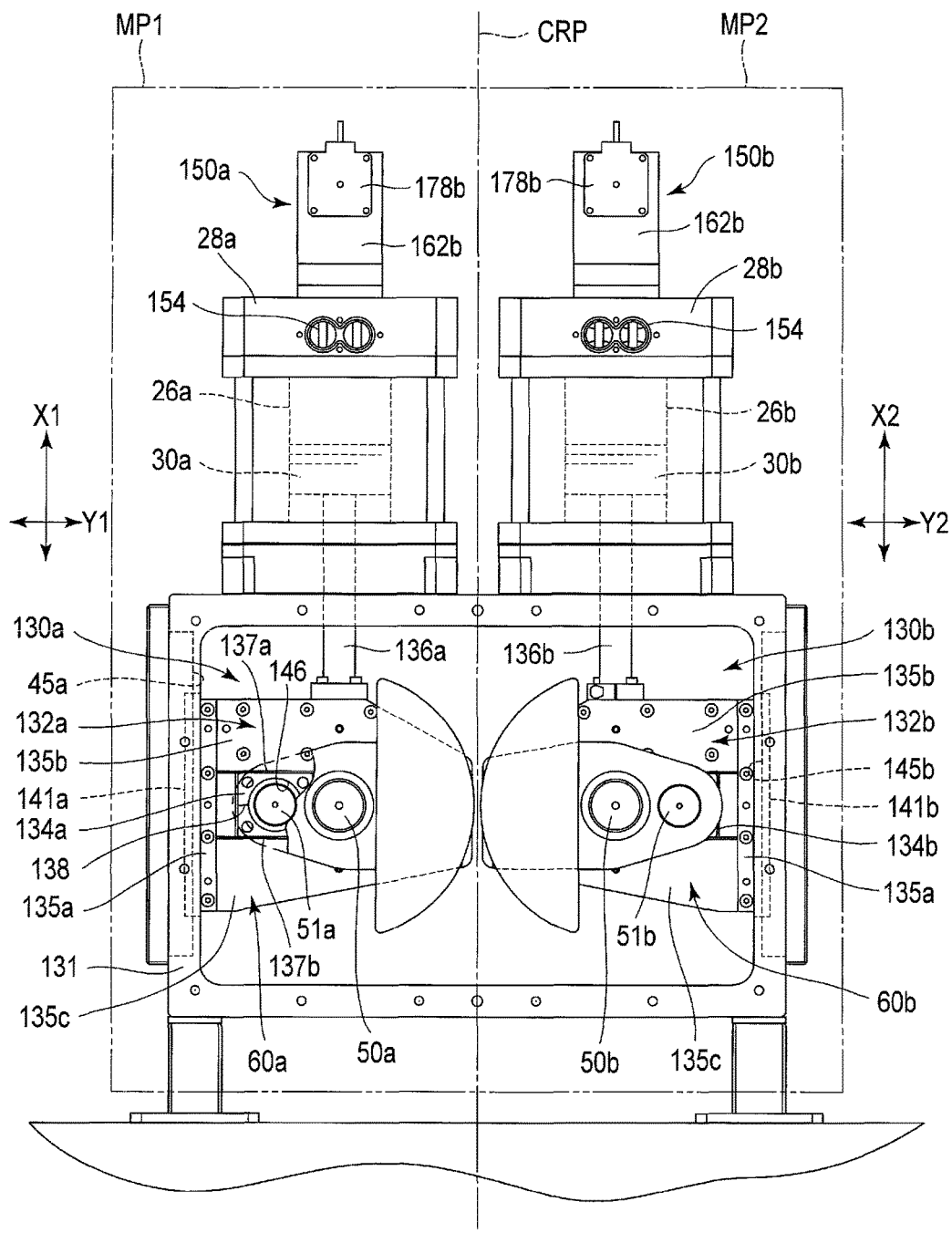
FIG. 17 is a front view of the expander according to the fourth embodiment.
Figure 18:
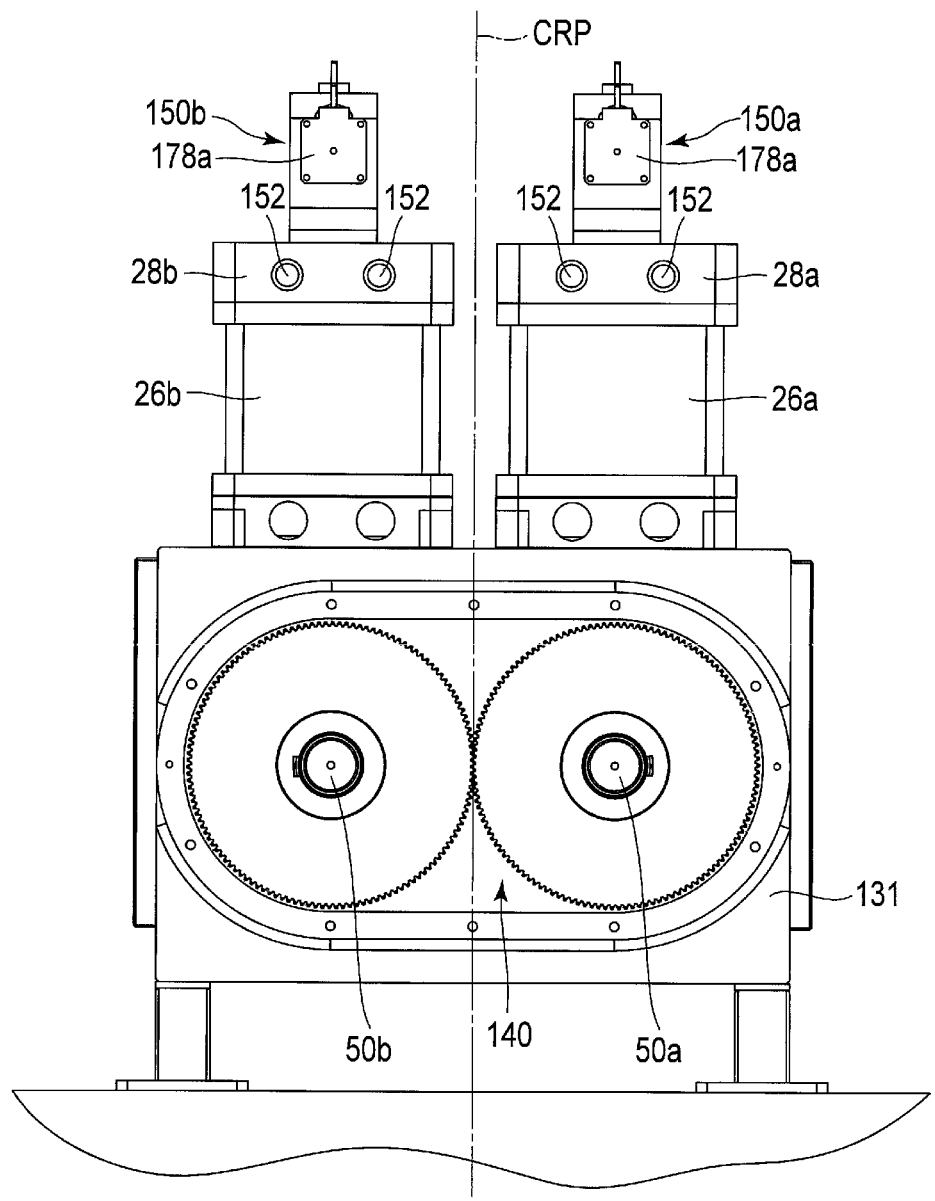
FIG. 18 is a rear view of the expander according to the fourth embodiment.

FIG. 16 is a perspective view showing the appearance of an expander according to the fourth embodiment, FIG. 17 shows a front view of the expander and FIG. 18 shows a rear view of the expander.

As shown in FIGS. 16 to 18, an expander 20 according to this embodiment comprises a rectangular box-shaped crankcase (base frame) 131, a first cylinder 26a and a second cylinder 26b formed on the crankcase 131, a first head cover 28a and a second head cover 28b which cover the top openings of the first and second cylinders 26a and 26b, respectively, and a first crankshaft 50a and a second crankshaft 50b rotatably supported in the crankcase 131. In this embodiment, the first crankshaft 50a and the second crankshaft 50b are arranged in parallel to each other. Further, the first cylinder 26a and the second cylinder 26b are arranged in parallel to each other and have the same inner diameter.

The first head cover 28a defines a first expansion/compression chamber with the first piston 30a in the first cylinder 26a. The second head cover 28b defines a second expansion/compression chamber with the second piston 30b in the second cylinder 26b.

A pair of intake ports and a pair of discharge ports opened in the upper part of the first cylinder 26a are formed in the first head cover 28a. The first head cover 28a is provided with a first valve mechanism 150a which opens/closes the pair of intake ports and the pair of outlet ports. The second head cover 28b is provided with a second valve mechanism 150b which opens/closes the pair of intake ports and the pair of outlet ports. The detailed structures of the first and second valve mechanisms 150a and 150b will be described later.

The expander 20 comprises a first drive unit 130a which drives the first crankshaft 50a, a second drive unit 130b having the same structure as that of the first drive unit 130a, which drives the second crankshaft 50b, and a coupler-synchronizing mechanism 140 which couples an end part of the first crankshaft 50a and an end part of the second crankshaft 50b and synchronously rotates the first crankshaft 50a and the second crankshaft 50b. The first drive unit 130a and the second drive unit 130b are arranged on the respective sides of a central reference plane CRP and further the first drive unit 130a and the second drive unit 130b are arranged to be symmetrical with respect to the central reference plane CRP in terms of lateral and longitudinal directions (mirror arrangement). The first drive unit 130a is located on one side of the central reference plane CRP and provided on a first mount plane MP1 which intersects perpendicularly with the central reference plane CRP, whereas the second drive unit 130b is located on the opposite side of the central reference plane CRP and provided on a second mount plane MP2 which perpendicularly intersects the central reference plane CRP, that is, the second mount plane MP2 being symmetrical to the first mount plane MP1. The first crankshaft 50a extends so as to perpendicularly intersect the first mount plane MP1. The second crankshaft 50b extends so as to perpendicularly intersect the second mount plane MP2.

The first drive unit 130a comprises a first piston 30a provided reciprocatively in the first cylinder 26a, the above-described first crankshaft 50a and a first XY-separation crank mechanism 60a provided between the first piston 30a and the first crankshaft 50a, which converts the reciprocating motion of the first piston 30a and the rotary motion of the first crankshaft 50a to each other. The first direction in which the first piston 30a reciprocates is defined as the first direction X1, which is parallel to the central reference plane CRP.

The second drive unit 130b comprises a second piston 30b provided reciprocatively in the second cylinder 26b, the above-described second crankshaft 50b and a second XY-separation crank mechanism 60b provided between the second piston 30b and the second crankshaft 50b, which converts the reciprocating motion of the second piston 30b and the rotary motion of the second crankshaft 50b to each other. The second direction in which the second piston 30b reciprocates is defined as the second direction X2, which is parallel to the central reference plane CRP.

The first XY-separation crank mechanism 60a and second XY separation crank mechanism 60b have the same structure and are arranged to be symmetrical with respect to the central reference plane CRP in terms of in terms of lateral and longitudinal directions. The structure of the first XY separation crank mechanism 60a, which is common to both, will be described in detail. As shown in FIGS. 16 and 17, the first XY-separation crank mechanism 60a comprises in the first mount plane MP1 including the central axis of the first piston 30a (the moving axis or the X-axis), a first support member (combinatory member) 132a provided reciprocatively in the first direction X1, a first crank connection member (crank connection plate) 134a attached to the first support member 132a so as to be reciprocative in the third direction Y1 (Y-axis direction) which perpendicularly intersects the first direction X1 in the first mount plane MP1, and a first connecting rod 136a as a connection member which connects the first piston 30a and the first support member 132a. The movable central axis (the first direction X1) of the first support member 132a, the movable central axis (the third direction Y1) of the first crank connection member 134a, and the movable central axis (the first direction X1) of the first connecting rod 136a are located in the first mount plane MP1.

In this embodiment, the first support member 132a is formed in a rectangular frame shape, for example. In other words, the first support member 132a includes a first support portion 135a extending in the first direction X1, and a second support portion 135b and a third support part 135c extending in the third direction Y1 from both axial ends of the first support part 135a, as one integral unit. In this embodiment, the first support member 132a comprises a fourth support portion 135d which connects the extending ends of the second support portion 135b and the third support portion 135c and opposes the first support portion 135a with a gap therebetween. Inner surfaces of the second support portion 135b and the third support portion 135c which oppose each other are formed to be flat and in parallel to each other while both extending in the third direction Y1. The first support member 132a is formed of aluminum, for example.

A first linear slider 141a is fixed to the first support portion 135a. Further, a first guide rail 145a is placed on an inner sidewall of the crankcase 131, so as to extend in the first direction X1 within the second mount plane MP1. The first linear slider 141a is reciprocatively supported and guided on the first guide rail 145a. With this structure, only the first support portion 135a of the first support members 132b is supported on the first guide rail 145a reciprocatively in the first direction X1. The first linear slider 141a may include a built-in ball bearing rollably contacting the first guide rail 145a.

The first crank connection member 134a has a rectangular block shape. The upper and lower sides of the first crank connection member 134a respectively form a first slide surface 137a and a second slide surface 137b. The first slide surface 137a and the second slide surface 137b are formed flat and in parallel to each other while extending in the third direction Y1.

A circular through-hole 146 is formed through substantially a central portion of the first crank connection member 134b. The through-hole 146 extends in a Z-axis direction which perpendicularly intersects the first direction X1 and the third direction Y1, that is, the direction parallel to the first crankshaft 50a. A crankpin 51a of the first crankshaft 50a is rotatably put through the through-hole 146. A plane bearing is formed on the slide surface of through-hole 146, that is, the inner surface thereof, by a lining process (plating) such as electrocasting or electrocoating. Wire cutting may be employed after the plating.

The first crank connection member 134a is arranged in the frame-like first support member 132b so that the first slide surface 160a slidably contacts the inner surface of the second support portion 135b and the second slide surface 160b slidably contacts the inner surface of the third support portion 135c. With this structure, the first crank connection member 134a and is supported and guided reciprocatively in the second direction Y1 between the second and third support portions 135b and 135c of the first support member 132b. Further, the crankpin 51a of the first crankshaft 50a is rotatably put through the through-hole 146 of the first crank connection member 134a. With this structure, the first crank connection member 134a is engaged with the first crankshaft 50a to connect the first crankshaft 50a and the first support member 132a.

Note that a guide rail extending in the second direction Y1 may be placed on the inner surfaces of both the second support part 135b and the third support part 135c of the first support member 132a. Further, a guide groove to be engaged with the guide rail may be formed in both the first slide surface 137a and the second slide surface 137b of the first crank connection member 34b.

The first crank connection member 134a comprises two components separated along separation planes 138 passing through the central axis of the through hole 146 and perpendicularly intersecting the first direction X1 (that is, the first half portion including the first slide surface 137a and the second half portion including the second slide surface 137b). As these two components are coupled with each other as the separation planes 138 match each other, the rectangular block-shaped crank connection member 134a is formed. The separation plane 138 passes along the central axis of the through-hole 146 and extends in the second direction Y1. Further, the separation planes 138 each have a wavy or S-letter configuration or a shape of projections and recesses formed in a cyclonic fashion. The projections and recesses on each separation plane 138 are arranged alternately in the Z-axis direction (the axial direction of the through-hole 146) and each projection and each recess extend in the second direction Y1. In this embodiment, each separation plane 138 has arc-shaped recesses and projections arranged alternately. The first half portion and the second half portion are formed so that the gap between the separation planes 138 thereof when they are engaged is about 100 µm. The first and second half portions should desirably be formed of a material easy conformable with lubricating oil, that is, for example, copper, brass, fine ceramics or the like. Further, the first and second half portion may also be made from an engineering plastic material such as ABS, whose surface is plated by vapor deposition, for example.

Note that the separation planes 138 of the first and second half portion may have two or more projections and/or two or more recesses. Further, the projections and recesses on each plane should just be arranged in the Z-axis direction. The shape of the projections and recesses themselves may not only be a curved surface but remodeled into various other forms.

One end of the first connecting rod 136a of the first XY-separation crank mechanism 60a is coupled to the first piston 30a through a supporting pin, and the other end is coupled to the second support portion 135b of the first support member 132a. The first connecting rod 136a extends to be parallel to the first direction X1 and coaxial with the first piston 30a. The first connecting rod 136a reciprocates with the first support member 132a in the first direction X1 integrally as one unit so as to reciprocate the first piston 30a in the first direction X1.

Note that the connection member may not only be a single connecting rod, but also be of two or more connecting rods or a plate-like connection arm expending in the third direction Y1.

As shown in FIGS. 17 and 18, the second XY-separation crank mechanism 60b comprises, as in the case of the first XY separation crank mechanism 60a, the rectangular frame-shaped second support member 132b provided to be reciprocative in the second direction X2 with the second linear slider 141b and the second guide rail 145b, the block-shaped second crank connection member 134b supported and guided in the second support member 132b so as to be reciprocative in the fourth direction Y2, and the second connecting rod 136b which connects the second support member 132b and the second piston 30b together. A crank-pin 51b of the second crankshaft 50b is rotatably put through the through-hole of the second crank connection member 134b.

As in the case of the first crank connection member 134a described above, the second crank connection member 134b comprises two components separated along separation planes passing through the central axis of the through hole and perpendicularly intersecting the third direction X3 (that is, the first half portion including the first slide surface and the second half portion including the second slide surface). As these two components are coupled with each other as the separation planes match each other, the rectangular block-shaped crank connection member 134b is formed.

The first XY-separation crank mechanism 60a and the second XY-separation crank mechanism 60b formed as described above are provided in the crankcase 131. The first XY-separation crank mechanism 60a and the second XY-separation crank mechanism 60b are arranged and configured to be symmetrical with respect to the central reference plane CRP and they operate while keeping a symmetrical state therebetween. Thus, the first piston 30a and the first crankshaft 50a, and the second piston 30b and the second crankshaft 50b operate while maintaining a symmetrical state with respect to the central reference plane CRP therebetween, respectively.

Both axial ends of the first crankshaft 50a are put through the sidewall of the crankcase 131, and rotatably supported by the crankcase 131 with respective bearings. The second crankshaft 50b extends parallel to the first crankshaft 50a, and both axial ends thereof are put through the sidewall of the crankcase 131 to be rotatably supported thereby with respective bearings.

As shown in FIG. 18, the coupler-synchronizing mechanism 140 of the expander 20 includes a first gear 144a attached coaxially to one end of the first crankshaft 50a and a second gear 144b attached coaxially to one end of the second crankshaft 50b. The first gear 144a and the second gear 144b are formed to have the same diameter and the same number of teeth and are engaged with each other. The first crankshaft 50a and the second crankshaft 50b are coupled with each other through the first gear 144a and the second gear 144b. When the first gear 144a rotates, the second gear 144b is rotated in a reverse direction to the first gear 144a in synchronous with the rotation of the first gear 144a. Thus, the first crankshaft 50a and the second crankshaft 50b rotate synchronously in the opposite directions.

Next, the first valve mechanism 150a and the second valve mechanism 150b provided respectively in the first and second head covers 28a and 28b will be described. Since the first valve mechanism 150a and the second valve mechanism 150b have the same structure, the second valve mechanism 150b will be described as a typical example.

Figure 19:
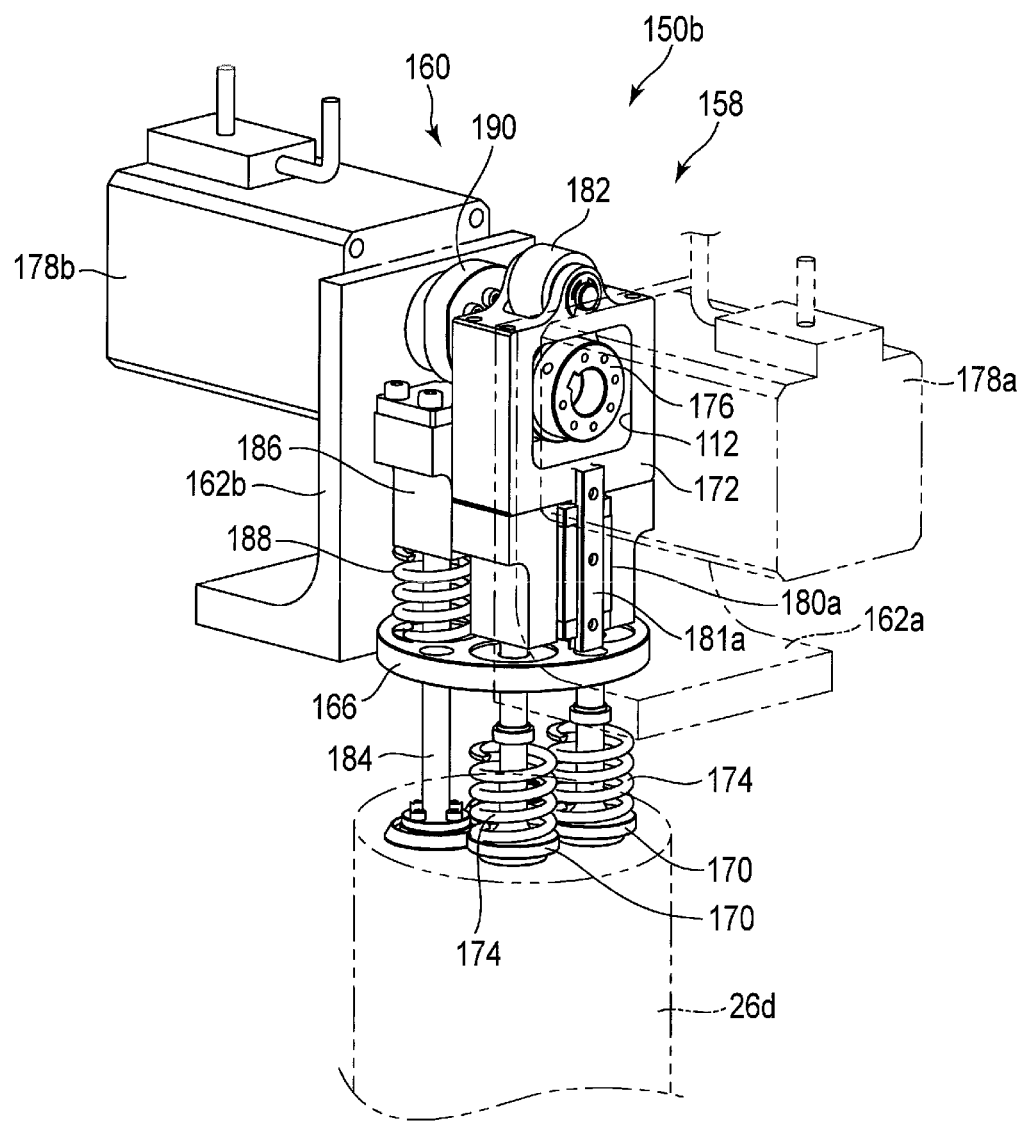
FIG. 19 is a perspective view showing a valve mechanism of the expander according to the fourth embodiment.
Figure 20:
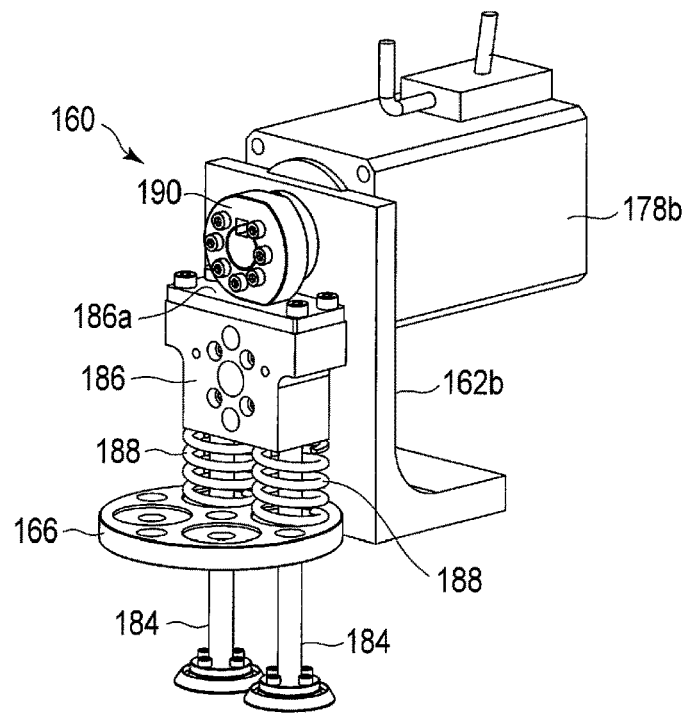
FIG. 20 is a perspective view showing an intake side of the valve mechanism.
Figure 21:
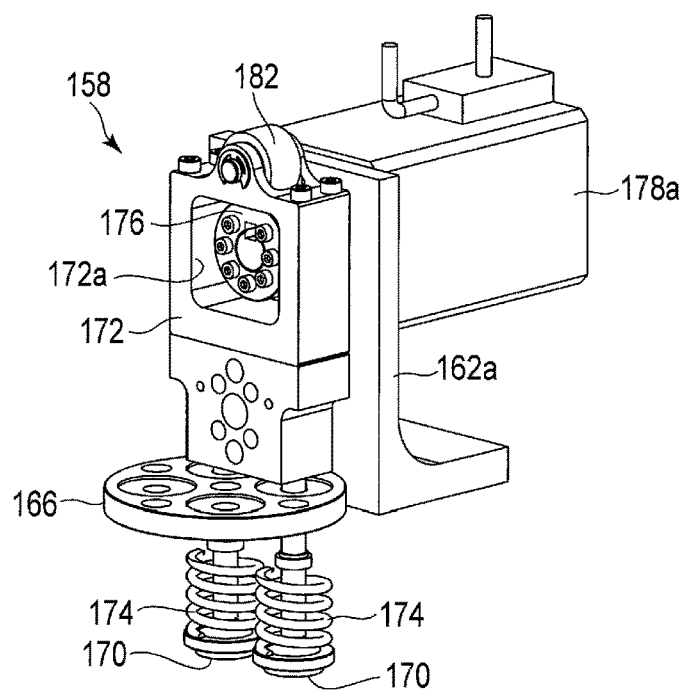
FIG. 21 is a perspective view showing an outlet side of the valve mechanism.

FIG. 19 is a perspective view of the second valve mechanism, FIG. 20 is a perspective view of an outlet-side valve mechanism of the second valve mechanism, FIG. 21 is a perspective view of an intake-side valve mechanism of the second valve mechanism, and FIG. 22 is a cross section of the second valve mechanism.

As shown in FIGS. 16 and 22, the second head cover 28b which closes the top opening of the second cylinder 26b is formed into substantially a rectangular block shape. The second head cover 28b includes a pair of intake openings 152 and a pair of outlet openings 154 communicating to the second cylinder 26b. One end (intake port 152a) of each intake opening 152 is opened to the bottom surface of the second head cover 28b and the other end opened to one side surface of the second head cover 28b. One end (outlet port 154a) of each outlet opening 154 is opened to the bottom surface of the second head cover 28b and the other end is opened to the other side surface of the second head cover 28b. A pipe (supply line) is connected to the intake-side opening of each intake opening 152 through an intake-side coupler, not illustrated, which guides low-temperature, high-pressure air to each intake opening 152 from a secondary cooler. Further, a pipe (outlet line) is connected to the outlet-side opening of each outlet opening 154 through an outlet-side coupler, not illustrated, which sends the cooling air discharged from the expander 20 to the freezer and the like through the pipe.

The second valve mechanism 150b includes an intake-side valve mechanism 158 which opens/closes the cylinder-side intake ports 152a of the pair of intake openings 152 and an outlet-side valve mechanism 160 which opens/closes the cylinder-side outlet ports 154a of the pair of outlet openings 154. A pair of brackets 162a and 162b are formed to stand on the top surface of the second head cover 28b. Each of the brackets 162a and 162b is formed in substantially an L-letter shape and includes a base portion 164a fixed to the second head cover 28b and a support portion 164b extending upward from the top surface of the second head cover 28b as one integral unit. Support portions 164b of the brackets 162a and 162b are arranged parallel to face each other with a gap therebetween. A disk-like guide plate 166 is attached to the top surface of the second head cover 28b between the brackets 162a and 162b.

As shown in FIGS. 19, 21 and 22, the intake-side valve mechanism 158 is formed in one of the brackets, bracket 162a. The intake-side valve mechanism 158 includes a pair of intake valves (for example, mushroom valves) (valve members) 170 which open/close the pair of intake ports 152a, a first slider (first cam follower) 172 coupled with the pair of intake valves 170 and supported ascendably/descendably by the support portion 164b of the bracket 162a, a first coiled spring (for example, helical compression spring) 174 which urges each suction valve 170 to the close position side, an intake cam 176 rollably contacting the first slider 172 and a first servo motor 178a which rotates the intake cam 176 directly.

The stem of each intake valve 170 is guided ascendably/descendably in the second direction X2 with the valve guide 171a and the guide plate 166 provided on the ceiling portion of the second head cover 28b so as to open/close the intake port 152a of the respective intake opening 152. The stem of each intake valve 170 is airtightly put through the valve guide 171a and the guide plate 166 to project upward from the second head cover 28b and coupled with the first slider 172. The first coiled spring 174 is provided between the head of each intake valve 170 and the valve guide 171a so as to urge the respective intake valve 170 in a direction to close the respective intake port 152a (downward).

The first slider 172 is formed in substantially a rectangular block shape and includes a side surface extending in the second direction X2. A first linear slider 180a extending in the second direction X2 is fixed on the side surface of the first slider 172, or formed integrally with the first slider 172 as one unit. Further, a first guide rail 181a extending in the second direction X2 is fixed to the support portion 164a of the bracket 162a opposing the side surface of the first slider 172. The first linear slider 180a of the first slider 172 is guided and supported slidably in the second direction X2 on the first guide rail 181a. The first linear slider 180a may include a built-in ball bearing which rollably contacting the first guide rail 181a.

For example, a rectangular opening 172a is formed in the upper end of the first slider 172 and the intake cam 176 is accommodated in the opening 172a. Further, a roller (cam follower) 182 is rotatably supported on the upper end of the first slider 172 so that a part of the roller 182 projects into the opening 172a. The intake cam 176 is provided to rollably contact the roller 182. As the intake cam 176 rotates, it pushes up the roller 182 at a predetermined timing. As a result, the first slider 172 and the intake valve 170 are pushed up together with the roller 182 in the second direction X2 and thus each intake valve 170 opens the respective intake port 152a. When the intake cam 176 rotates further and the small diameter portion of the intake cam 176 is brought into contact with the roller 182, the first slider 172 and the pair of intake valves 170 are pushed down with the urging force of the first coiled spring 174 and thus each intake valve 170 closes the respective intake port 152a. Note that the roller 182 may be omitted and the first slider 172 may be pushed up directly by the intake cam 176.

The first servo motor 178a which rotates the intake cam 176 stores its rotational speed and the rotation angle position so as to be able to rotate the intake cam 176 at a predetermined speed and a predetermined timing. In this manner, the suction can be carried out at a desired timing to open/close the intake valves 170, and thus the air or other fluid can be sent into the first cylinder 26b. The control mode of the first servo motor 178a will be described in detail later.

As shown in FIGS. 19, 20 and 22, the outlet-side valve mechanism 160 is provided in the other bracket 162b. The outlet-side valve mechanism 160 comprises a pair of outlet valves (for example, mushroom valves) (valve members) 184 which opens/closes the pair of outlet ports 154a, a second slider (first cam follower) 172 coupled with the pair of outlet valves 184 and supported ascendably/descendably by the support portion 164b of the bracket 162b, a second coiled spring (for example, helical compression spring) 188 which urges each suction valve 184 to the close position side, an outlet cam 190 rollably contacting the second slider 186 and a second servo motor 178b which rotates the outlet cam 176 directly.

The stem of each intake valve 184 is guided ascendably/descendably in the second direction X2 with the valve guide 171b and the guide plate 166 provided on the ceiling portion of the second head cover 28b so as to open/close the opening of the outlet port 154a on the cylinder 26 side. The stem of each intake valve 184 is airtightly put through the valve guide 171b and the guide plate 166 to project upward from the second head cover 28b and coupled with the second slider 186. The second coiled spring 188 is provided between the second slider 186 and the guide plate 166 around the step of each outlet valve 184 so as to urge the second slider 186 and the respective outlet valve 184 in a direction to close the respective outlet port 154a (upward).

The second slider 186 is formed in substantially a rectangular block shape and includes a side surface extending in the second direction X2. A second linear slider 180b extending in the second direction X2 is fixed on the side surface of the second slider 186, or formed integrally with the second slider 186 as one unit. Further, a second guide rail 181b extending in the second direction X2 is fixed to the support portion 164b of the bracket 162b opposing the side surface of the second slider 186. The second linear slider 180b of the second slider 186 is guided and supported slidably in the second direction X2 on the second guide rail 181b. The second linear slider 180b may include a built-in ball bearing which rollably contacting the second guide rail 181b.

An upper end face 186a of the second slider 186 is formed into a flat surface which perpendicularly intersects the second direction X2, so as to be rollably or slidably contacting the outlet cam 190. As the outlet cam 190 rotates, it pushes up the second slider 186 at a predetermined timing. As a result, the pair of outlet valves 184 are pushed down together with the second slider 186 in the second direction X2 and thus each outlet valve 184 opens the respective outlet port 154a. When the outlet cam 190 rotates further and the small diameter portion of the outlet cam 190 is brought into contact with the upper end face 186a of the second slider 186, the second slider 186 and the pair of outlet valves 184 are pushed up with the urging force of the second coiled spring 188 and thus each outlet valve 184 closes the respective outlet port 154a.

The second servo motor 178b which rotates the outlet cam 190 stores its rotational speed and the rotation angle position so as to be able to rotate the outlet cam 190 at a predetermined speed and a predetermined timing. In this manner, the outlet ports 154 are opened/closed at a desired timing to the intake 170 to discharge the compressed air or other fluid in the first cylinder 26b from the outlet openings 154. The control mode of the second servo motor 178b will be described in detail later. Note that the first servo motor 178a and the second servo motor 178b are connected to the controller (controller) 192 including a power source, and controlled by the controller.

At the start of the expander 20 having the above-described structure, as the first crankshaft 50a and/or the second crankshaft 50b is rotated with a motor or the like, not illustrated, the first crankshaft 50a and the second crankshaft 50b are synchronously rotated in mutually reverse directions by the coupler-synchronizing mechanism 140. The crankpins 51a and 51b of the crankshafts eccentrically rotate around the respective crankshafts.

The eccentric rotary motion of the crankpin 51a of the first crankshaft 50a is separated into the reciprocating motion in the third direction Y1 and the reciprocating motion in the first direction X1 by the first crank connection member 134a and the first support member 132a of the first XY-separation crank mechanism 130a, and the reciprocating motion of the first support member 132a in the first direction X1 is transmitted to the first piston 30a through the first connecting rod 136a. Thus, the first piston 30a reciprocates within the first cylinder 26a in the first direction X1 so as to compress the fluid in the first cylinder 26a, and then discharge the pressurized fluid through the outlet openings 154.

Similarly, the eccentric rotary motion of the crankpin 51b of the second crankshaft 50b is separated into the reciprocating motion in the fourth direction Y2 and the reciprocating motion in the second direction X2 by the second crank connection member 134b and the second support member 132b of the second XY-separation crank mechanism 130b, and the reciprocating motion of the second support member 132b in the second direction X2 is transmitted to the second piston 30b through the second connecting rod 136b. Thus, the second piston 30b reciprocates within the second cylinder 26b in the second direction X2 so as to compress the fluid in the first cylinder 26a, and then discharge the pressurized fluid through the outlet openings 154.

The first drive unit 20a and the second drive unit 20b are arranged to be symmetrical laterally and longitudinally with respect to the central reference plane CRP, and therefore they operates while maintain the symmetrical state. When the first piston 30a moves to an upper dead center, the second piston 30b also synchronously moves to an upper dead center. Then, when the first piston 30a moves toward a lower dead center from the upper dead center, the second piston 30b simultaneously moves toward a lower dead center from the upper dead center. While the first XY-separation crank mechanism 130a and the second XY-separation crank mechanism 130b operate synchronously with each other while maintaining the symmetrical state with respect to the central reference plane CRP.

When the first piston 30a and the second piston 30b reach the respective upper dead centers, the intake valve 170 is opened by the first valve mechanism 150a and the second valve mechanism 150b so as to supply low-temperature, high-pressure air to the expansion/compression chambers of the first cylinder 26a and the second cylinder 26b from the intake openings 152. After the intake valve 170 is closed, when the first piston 30a and the second piston 30b descend toward the lower dead centers, the volumes of the expansion/compression chambers of the first cylinder 26a and the second cylinder 26b increase gradually and the low-temperature, high-pressure air inside adiabatically expands. As a result, the air is cooled to a cryogenic temperature of −80 to −100° C. Further, when the first piston 30a and the second piston 30b move toward the upper dead centers from the lower dead centers, the outlet valves 184 are opened by the first valve mechanism 150a and the second valve mechanism 150b, so as to discharge the cooled air (cold air) in the expansion/compression chambers of the first cylinder 26a and the second cylinder 26b while being pushed with first and the second pistons 30a and 30b from the outlet openings 154 to the pipes. The discharged cooled air is emitted into the freezer through the pipes to cool the inside of the freezer.

After starting the expander 20, the first piston 30a and the second piston 30b are driven with the low-temperature, high-pressure air, and their reciprocating motions are converted into rotary motion by the first XY-separation crank mechanism 160a and the second XY-separation crank mechanism 160b to rotate and first and the second crankshafts 50a and 50b. In other words, the first and second crankshafts 50a and 50b are rotated by the expansile force of the high-pressure air, and this rotational force can be used to drive a power generator and the like, thus making it possible to obtain regenerative power.

According to the expander 20 having the above-described structure including the first drive unit 60a and the second drive unit 60b, the rotary motion of the first crankshaft 50a and the rotary motion of the second crankshaft 50b are separated and converted by the first and second XY-separation crank mechanisms 130a and 130b into t can dissociate and change into the linear reciprocating motions in the first and second directions and the linear reciprocating motions in the third and fourth directions which perpendicularly intersects the first and second directions, respectively, thereby making it possible to realize the perfect parallel motions of the first piston 24a and second piston 24b.

In this manner, uneven contact of the pistons with respect to the cylinders can be avoided, and therefore the sealing property can be improved, the friction loss can be reduced and the loss due to side thrust can be lessened, achieving a high efficiency. Further, since the first drive unit 60a and the second drive unit 60b are arranged and configured to be symmetrical with respect to the central reference plane (mirror arrangement), vibration caused by a deviation can be completely canceled, thereby making it possible to achieve a non-vibrating rotation structure by two cylinders. Note that the drive unit of this embodiment can be applied not only to an expander but also to a pump and a compressor.

According to the first and second valve mechanisms 150a and 150b of this embodiment, the outlet valves 170 and 184 can be opened/closed by the linear sliders without a side loss. Further, by driving the cam with a servo motor, it becomes possible to open/close the valves at high speed and desired timings.

In the conventional cases where a valve is driven by a cam shaft, the mechanism is controlled to fix the angle position at constant even if the rotation speed of the cam shaft changes. For this reason, such a valve mechanism is inapplicable to such an operational mode as to change the angle position to change the inflow of fluid. Moreover, in a valve mechanism which opens/closes a valve by a solenoid, the angle can be changed, but the mechanism is applicable only to a low-speed drive of 10 Hz or less, not applicable to the high-speed opening/closing of a valve.

By contrast, according to the valve mechanism of this embodiment, the servo motors 178a and 178b which drive the valves (cams) follow up the rotation speed and the rotation angle position, achieving an appropriate control. Therefore, the allowance range for timing variable can be taken large for the same cam. Further, unlike the driving of a solenoid, the cam can be rotated in the same direction with a servo motor to achieve a high-speed opening/closing of the valves even at 100,000 rpm, making it possible to finely control the mechanism by the high-speed valve opening/closing operation.

Furthermore, by combining the first and second drive units 60a and 60b of the symmetrical arrangement (mirror arrangement) and symmetrical operation, described above, with the above-described valve mechanisms, an expander, fuel feed pump and compressor with large flow rate in their open/close operations can be realized.

Figure 23:
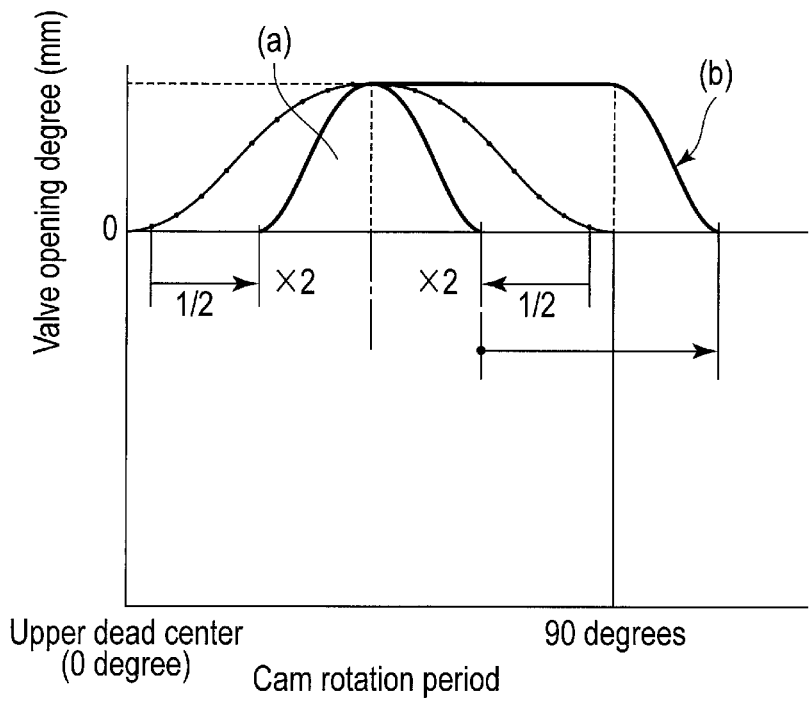
FIG. 23 is a diagram showing the relationship between the rotation period of the cam and the degree of opening/closing of the valve.

FIG. 23 shows an example of the control mode (short-time open/close cam control) of valve mechanisms, illustrating the relationship between a cam rotation period and the opening degree of a valve. In FIG. 23, the dot line indicates the change in the valve opening degree according to one rotation period when the cam is rotated at fixed speed. In the valve mechanisms 150a and 150b of this embodiment, while the intake cam 176 which opens/closes the intake valves 170 rotates one round, for example, the rotation speed of the intake cam 176 is slowed down to one half of the fixed speed between before and after the valve opening starting position and the valve closing ending position and accelerated twice as high as the fixed speed between immediately before and after the valve opening position (central position) by control of the first servo motor 178a as shown by reference (a) in FIG. 23. With this structure, it becomes possible to set the time required for opening/closing of the intake valves 170 to one half as compacted to the case of the fixed speed. Further, for example, by using the servo motors 178a and 178b even up to the rotating speed limit, it becomes possible to cut down the opening/closing time of the valve to one fourth. Thus, the speed of opening/closing the valve can be achieved to shorten the time to open/close the valves. More specifically, here, the fluid can be supplied at high pressure, and therefore it becomes possible to supply a necessary amount of flow into the cylinder in short time.

The opening/closing speed and opening/closing time of the valves are controlled as described above, the increase/decrease of the flow of the expander can be controlled. In the air refrigeration system, the expansion timing can be set long, and therefore the range of control of the temperature can be expanded. Thus, the temperature can be freely varied. The variability in the inflow can be expanded further if the inflow pressure is changed.

As indicated by reference symbol (b) in FIG. 23, if the rotation speed of the cam at the time of closing the intake valves 170 is slowed down to one half, a twice as large opening angle can be secured, making it possible to greatly increase the suction amount.

Figure 24:
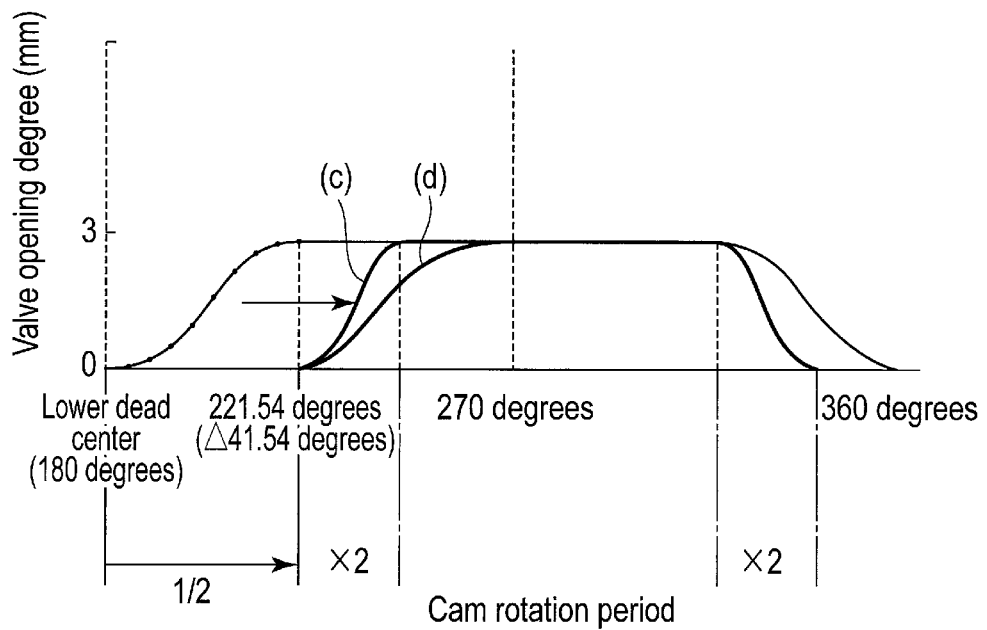
FIG. 24 is a diagram showing the relationship between the rotation period of the cam and the degree of opening/closing of the valve.

FIG. 24 shows another example of the control mode (long-time open/close cam control) of the valve mechanism, illustrating the relationship between the cam rotation period and the opening degree of the valve. In FIG. 24, the dot line indicates the change in the valve opening degree according to the rotation period when the cam is rotated at fixed speed.

As indicated by reference symbol (c) in FIG. 24, with the valve mechanisms 150a and 150b of this embodiment, for example, while the outlet cam 190 which opens/closes the outlet valves 184 rotates one round, the rotation speed of the outlet cam 190 is slowed down to one half of the fixed speed from the valve opening starting position and accelerated twice as high as the fixed speed just before the valve opening position by control of the second servo motor 178b. In this manner, the time required to open the outlet valves 184 can be set to one half as compared to the case of the fixed speed. For this reason, the slew rate can be varied, and therefore the valve operation without a leak can be realized by quick opening/closing of the valve. Further, the rise time for opening the valve can be quickened so as to be able to have a longer time to discharge the fluid. Thus, the discharge of the cool air in the cylinder can be reliably carried out. In this manner, the loss due to the remaining pressure in the cylinder can be prevented.

Moreover, as indicated by reference symbol (d) in FIG. 24, a twice as large opening angle can be secured by making the rotating speed of the outlet cam 190 to one half in the valve opening/closing zone. For this reason, even if the rotation speed of the main device is slow, a necessary flow can be obtained. At the same time, a quick valve opening/closing operation can be realized, avoiding a leak.

As described above, with the valve mechanisms 150a and 150b, the central position (the maximum opening position) of the opening/closing of the valve can be freely changed, and therefore the timing for opening/closing the valve can be optimally controlled. Therefore, the supply and discharge of cool air can be precisely carried out at high speed with high sealing property. Simultaneously, the suction amount and the discharge amount can be arbitrarily changed. In this manner, the suction amount and discharge amount can be arbitrarily changed to make it possible to achieve complete combustion at the optimal combustion ratio in an engine. In an air refrigeration system, the expansion ratio of the expander and the air cooling efficiency can be further improved. For example, it is easy to make the compression-expansion ratio to ten or higher, and cooling by −100° C. or more can be achieved by one stage.

Furthermore, in the above-described valve mechanism, the rotating speed of the cam is controlled arbitrarily by rotating the servo motor only in one direction, thereby making it possible to suppress the increase in temperature of the servo motor and to save energy. By merely with the acceleration/deceleration operation of the servo motor, the slew rate can be freely changed in designing when the cam moves its central angle, or the cam itself ascends or descends. Therefore, the cam shape optimal for the sinusoidal operation of the cam can be selected. In this manner, the surging which may be caused by the undercutting of the cam shape, which is the conventional way of changing the slew rate, can be prevented and therefore unusual vibration of the cam can be prevented.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

In the XY-separation crank mechanism, the support member or the support portion which reciprocatively supports a crank connection member is not limited to a linear slider, but some other support structures may be employed. In place of the linear slider, a dovetail slide support structure may be used. Further, a magnetic levitation system such as a linear motor mechanism can also be introduced to the linear guide of the XY separation crank mechanism. In this case, a further high speed driving can be achieved. The expander is not limited to a 1-cylinder type, but may be a 2- or more cylinder type. The expander is not limited to the so-called vertical type, but may be of a horizontal type in which the cylinder and piston are arranged horizontally.

What is claimed is:

1. An expander comprising:
a piston provided reciprocatively in a first direction in a cylinder;
a crankshaft extending to intersect perpendicularly a reference plane including a moving axis in the first direction of the piston;
an XY-separation crank mechanism provided between the piston and the crankshaft, which converts a reciprocating motion of the piston and a rotary motion of the crankshaft into one another, the XY-separation crank mechanism comprising a support member reciprocative in the first direction, and a crank connection member provided reciprocatively on the support member in a second direction perpendicular to the first direction, to which a crank of the crankshaft is rotatably engaged, and a coupling member which couples the piston and the support member so as to reciprocate together with the piston and the support member in the first direction;
a cylinder head provided on the cylinder to define a first expansion/compression chamber between the cylinder head and the piston, and including an intake port and an outlet port which communicate to the first expansion/compression chamber;
a suction valve supported, reciprocatively in a third direction, by the cylinder head, and configured to open/close the intake port;
a discharge valve supported, reciprocatively in a fourth direction, by the cylinder head, and configured to open/close the outlet port;
an intake-side valve mechanism which opens/closes the suction valve; and
an outlet-side valve mechanism which opens/closes the discharge valve,
wherein at least one of the intake-side valve mechanism and the outlet-side valve mechanism comprised an XY separation drive mechanism, and the XY separation drive mechanism comprises a first hinge member attached to the cylinder head, a rocker arm pivotably attached to the first hinge member, a Y-axis separation slider coupled with the suction valve and supported by the first hinge member reciprocatively in the third direction, an X-axis separation slider supported pivotally by one end of the rocker arm and coupled with the Y-axis separation slider reciprocatively in a direction perpendicularly intersecting the third direction and a cam contacting another end of the rocker arm to swing the rocker arm.

2. The expander of claim 1, wherein the support member comprises a first support part prolonged in the first direction, and a second support part prolonged in the second direction from the first support part, and is formed in the shape of an L character, and the first support part is supported with a first slider slidable in the first direction.

3. The expander of claim 2, wherein
the crank connection member is attached to a second slider slidable in the second direction, and the crank of the crankshaft is rotatably supported by the crank connection member.

4. The expander of claim 1, wherein
the cylinder includes a partition opposing the cylinder head with a gap therebetween, and defining a second expansion/compression chamber between the partition and the piston, and a second intake and a second outlet which communicate to the second expansion/compression chamber, and
which further comprises:
a second intake-side valve mechanism including a second suction valve which opens/closes the second intake; and
a second outlet-side valve mechanism including a second discharge valve which opens/closes the second outlet.

5. The expander of claim 4, wherein
the coupling member which couples the piston and the support member with each other extends to be airtightly put through the partition.

6. The expander of claim 4, wherein
at least one of the second intake-side valve mechanism and the second outlet-side valve mechanism comprises an XY-separation drive mechanism.

7. An air refrigerating device comprising:
a compressor which pressurizes and cools air;
the expander of claim 1, which takes in pressurized air discharged from the compressor and cools and discharges the pressurized air.

8. The air refrigerating device of claim 7, further comprising a refrigerating unit which applies the cold air discharged from the expander to an item to be frozen, and freezes the item.

9. The air refrigerating device of claim 8, wherein,
the refrigerating unit comprises a cooling covering provided to cover the item to be frozen, and an air-pipe which guides the cooling air discharged from the expander into the cooling cover.

10. The air refrigerating device of claim 9, wherein
the cooling cover is pivotally supported between a cooling position where the item to be frozen is covered and an open position where the item is uncovered.

11. The air refrigerating device of claim 7, further comprising, a power generator, an engine, a first clutch which connects the expander and the power generator together, a second clutch which connects the engine and the power generator and a third clutch which connects the compressor and the engine.

12. An expander comprising:
a piston provided reciprocatively in a first direction in a cylinder;
a crankshaft extending to intersect perpendicularly a reference plane including a moving axis in the first direction of the piston;
an XY-separation crank mechanism provided between the piston and the crankshaft, which converts a reciprocating motion of the piston and a rotary motion of the crankshaft into one another, the XY-separation crank mechanism comprising a support member reciprocative in the first direction, and a crank connection member provided reciprocatively on the support member in a second direction perpendicular to the first direction, to which a crank of the crankshaft is rotatably engaged, and a coupling member which couples the piston and the support member so as to reciprocate together with the piston and the support member in the first direction;
a cylinder head provided on the cylinder to define a first expansion/compression chamber between the cylinder head and the piston, and including an intake port and an outlet port which communicate to the first expansion/compression chamber;
a suction valve supported, reciprocatively in a third direction, by the cylinder head, and configured to open/close the intake port;
a discharge valve supported, reciprocatively in a fourth direction, by the cylinder head, and configured to open/close the outlet port;
an intake-side valve mechanism which opens/closes the suction valve;
an outlet-side valve mechanism which opens/closes the discharge valve,
wherein
at least one of the intake-side valve mechanism and the outlet-side valve mechanism comprises an XY separation drive mechanism,
the cylinder includes a partition opposing the cylinder head with a gap therebetween, and defining a second expansion/compression chamber between the partition and the piston, and a second intake and a second outlet which communicate to the second expansion/compression chamber, and
wherein the partition further comprises:
a second intake-side valve mechanism including a second suction valve which opens/closes the second intake; and
a second outlet-side valve mechanism including a second discharge valve which opens/closes the second outlet, and
wherein
the coupling member which couples the piston and the support member with each other extends to be airtightly put through the partition.

13. An air refrigerating device comprising:
a compressor which pressurizes and cools air;
an expander, which takes in pressurized air discharged from the compressor and cools and discharges the pressurized air; and
a refrigerating unit which applies the cold air discharged from the expander to an item to be frozen, and freezes the item, wherein the expander comprises:
a piston provided reciprocatively in a first direction in a cylinder;

a crankshaft extending to intersect perpendicularly a reference plane including a Moving axis in the first direction of the piston;

an XY-separation crank mechanism provided between the piston and the crankshaft, which converts a reciprocating motion of the piston and a rotary motion of the crankshaft into one another, the XY-separation crank mechanism comprising a support member reciprocative in the first direction, and a crank connection member provided reciprocatively on the support member in a second direction perpendicular to the first direction, to which a crank of the crankshaft is rotatably engaged, and a coupling member which couples the piston and the support member so as to reciprocate together with the piston and the support member in the first direction;

a cylinder head provided on the cylinder to define a first expansion/compression chamber between the cylinder head and the piston, and including an intake port and an outlet port which communicate to the first expansion/compression chamber;

a suction valve supported, reciprocatively in a third direction, by the cylinder head, and configured to open/close the intake port;

a discharge valve supported, reciprocatively in a fourth direction, by the cylinder head, and configured to open/close the outlet port;

an intake-side valve mechanism which opens/closes the suction valve; and an outlet-side valve mechanism which opens/closes the discharge valve, wherein at least one of the intake-side valve mechanism and the outlet-side valve mechanism comprises an XY separation drive mechanism.

\* \* \* \* \*